United States Patent [19]

Masunaga et al.

[11] 4,135,815
[45] Jan. 23, 1979

[54] RANGE FINDING DEVICE

[75] Inventors: Makoto Masunaga, Tokyo; Kazuya Hosoe, Machida; Tokuichi Tsunekawa; Shuichi Tamura, both of Yokohama; Hideo Yokota, Tokyo, all of Japan

[73] Assignee: Canon Kabushiki Kaisha, Tokyo, Japan

[21] Appl. No.: 865,924

[22] Filed: Dec. 30, 1977

[30] Foreign Application Priority Data

Jan. 6, 1977 [JP] Japan ................................. 52-504

[51] Int. Cl.² .................... G01C 3/08; G01C 3/00; G03B 7/08
[52] U.S. Cl. ................................... 356/4; 250/201; 250/204; 354/25; 356/1
[58] Field of Search ............... 356/1, 4; 250/201, 204; 354/25

[56] References Cited

U.S. PATENT DOCUMENTS

| | | | |
|---|---|---|---|
| 3,553,455 | 1/1971 | Sato et al. | 250/201 |
| 3,838,275 | 9/1974 | Stauffer | 250/204 |
| 3,898,676 | 8/1975 | Machida et al. | 356/5 |
| 4,002,899 | 1/1977 | Stauffer | 354/25 |
| 4,004,852 | 1/1977 | Pentecost | 356/4 |
| 4,010,479 | 3/1977 | Nobusawa | 356/4 |
| 4,059,758 | 11/1977 | Wilwerding | 354/25 |

Primary Examiner—S. C. Buczinski
Attorney, Agent, or Firm—Fitzpatrick, Cella, Harper & Scinto

[57] ABSTRACT

A range finding device of a construction, in which, at the time of receiving first and second images of an object to be formed by a range finding optical system with a relative positional parallax corresponding to the object distance into first and second photoelectric light receiving elements, respectively, these images are shifted on the light receiving surfaces of the respective first and second light receiving elements by a vibrating optical device at a same cycle and same phase to thereby scan these first and second images by the first and second light receiving elements; image scanning signals on the first and second images to be obtained at this time are converted into digital values; thereafter, these values are stored in the first and second storing devices where the coincidence and non-coincidence of these digitalized image scanning signals are detected by means of a coincidence detecting device, while one of these image scanning signals are relatively shifted bit by bit with respect to other image scanning signals; and the shift bit quantitites required until the image scanning signals of the same bit numbers of these first and second images may become optimumly coincided, thereby finding out the object distance from the shift bit quantities at the time.

12 Claims, 18 Drawing Figures

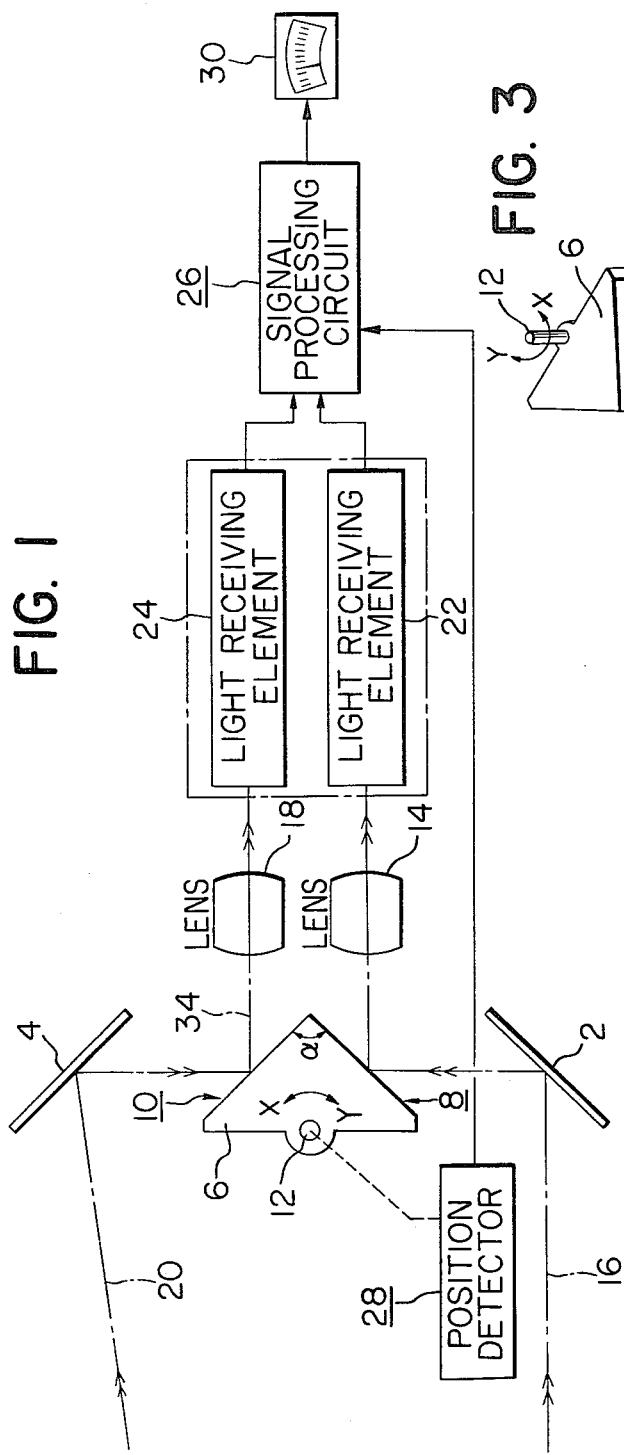

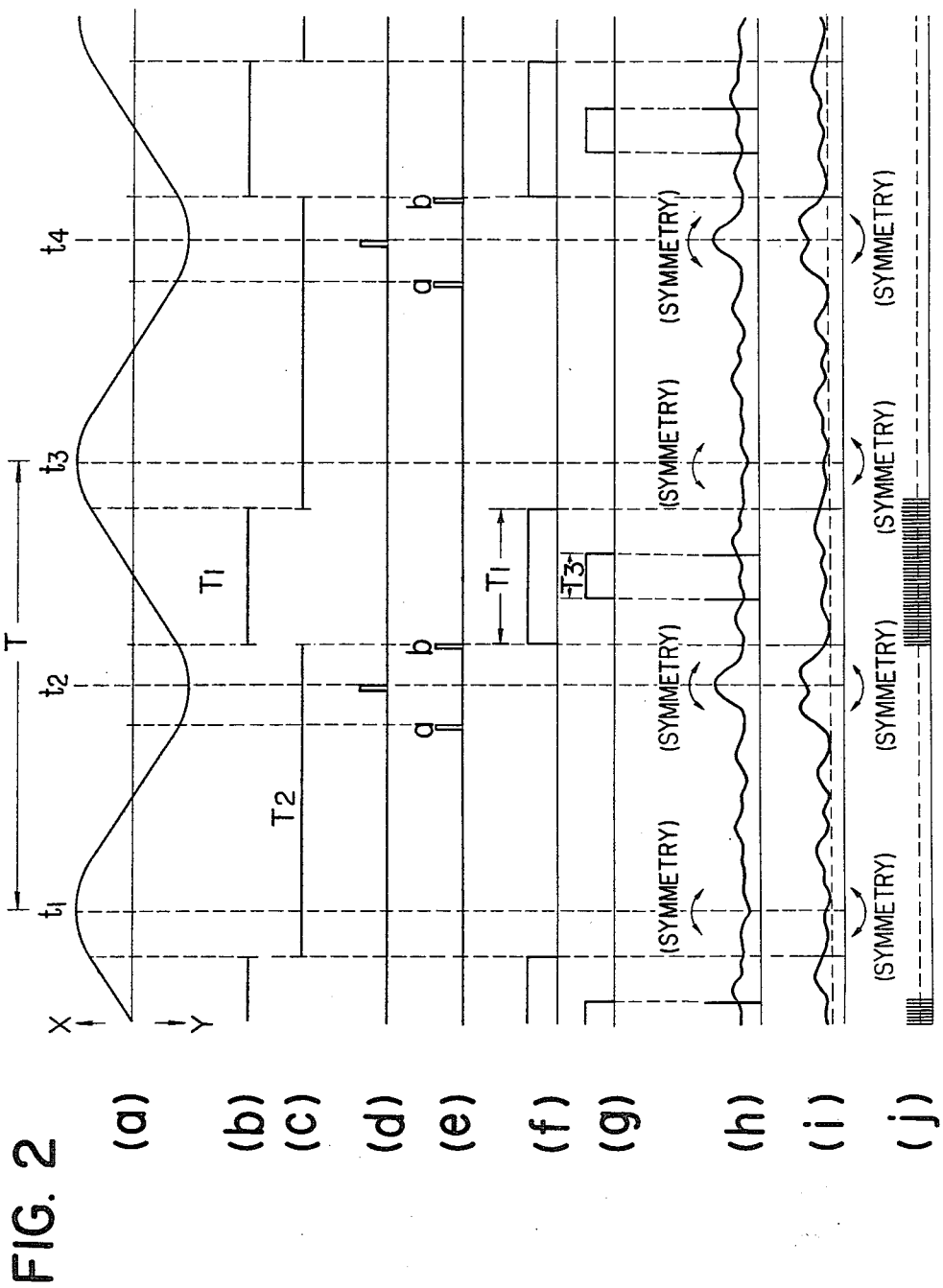

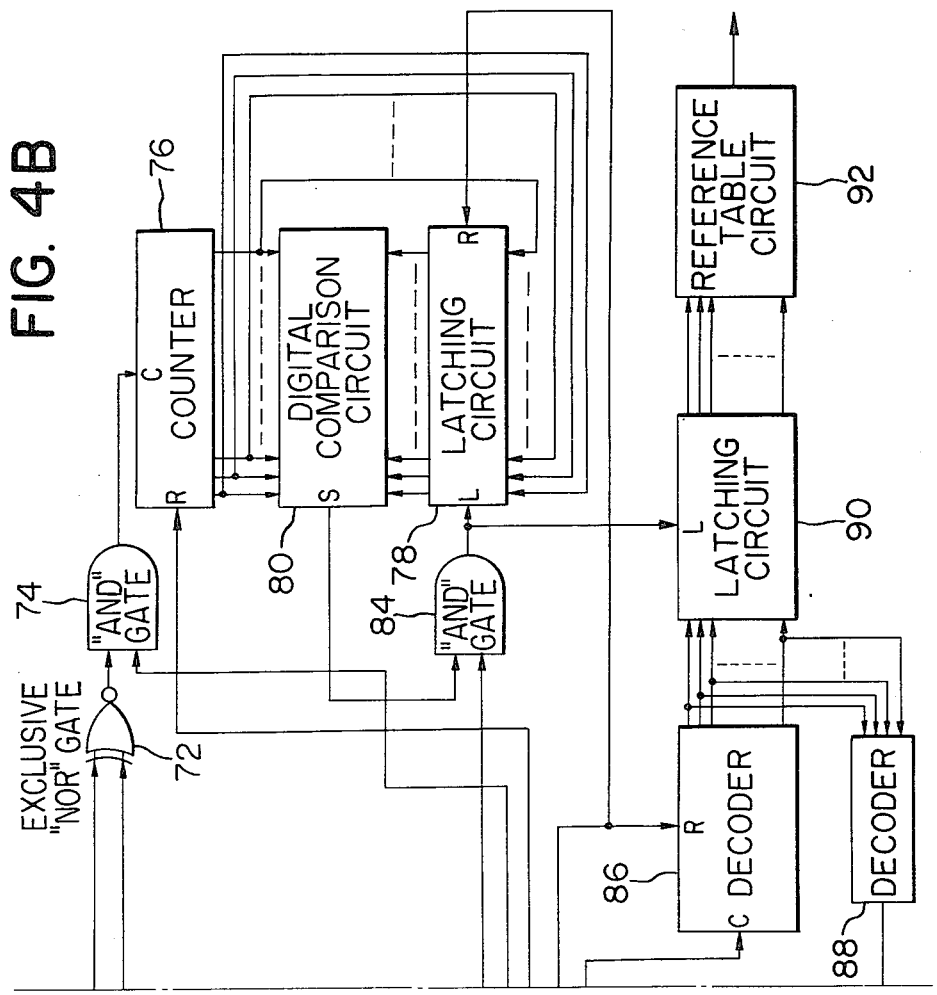

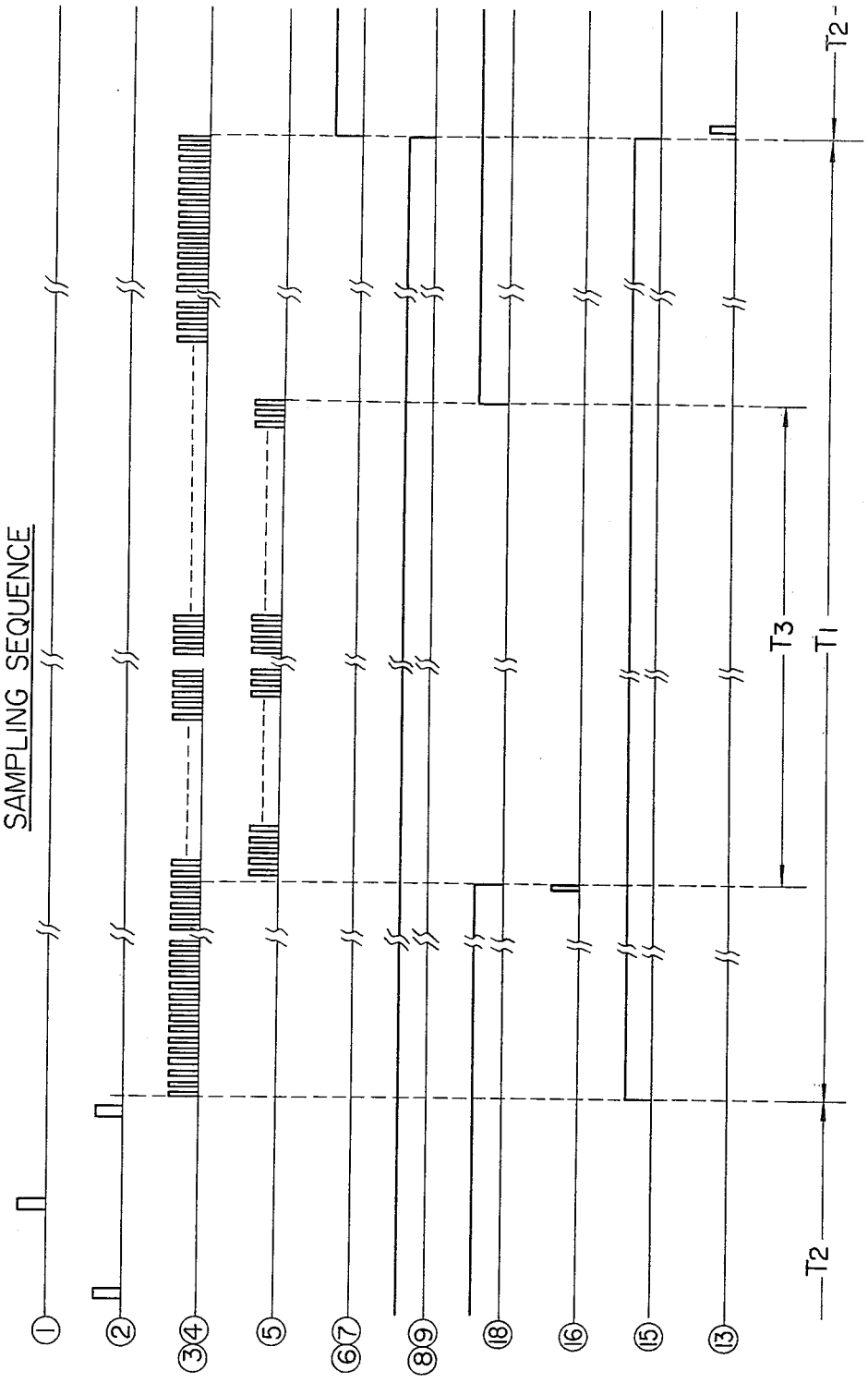

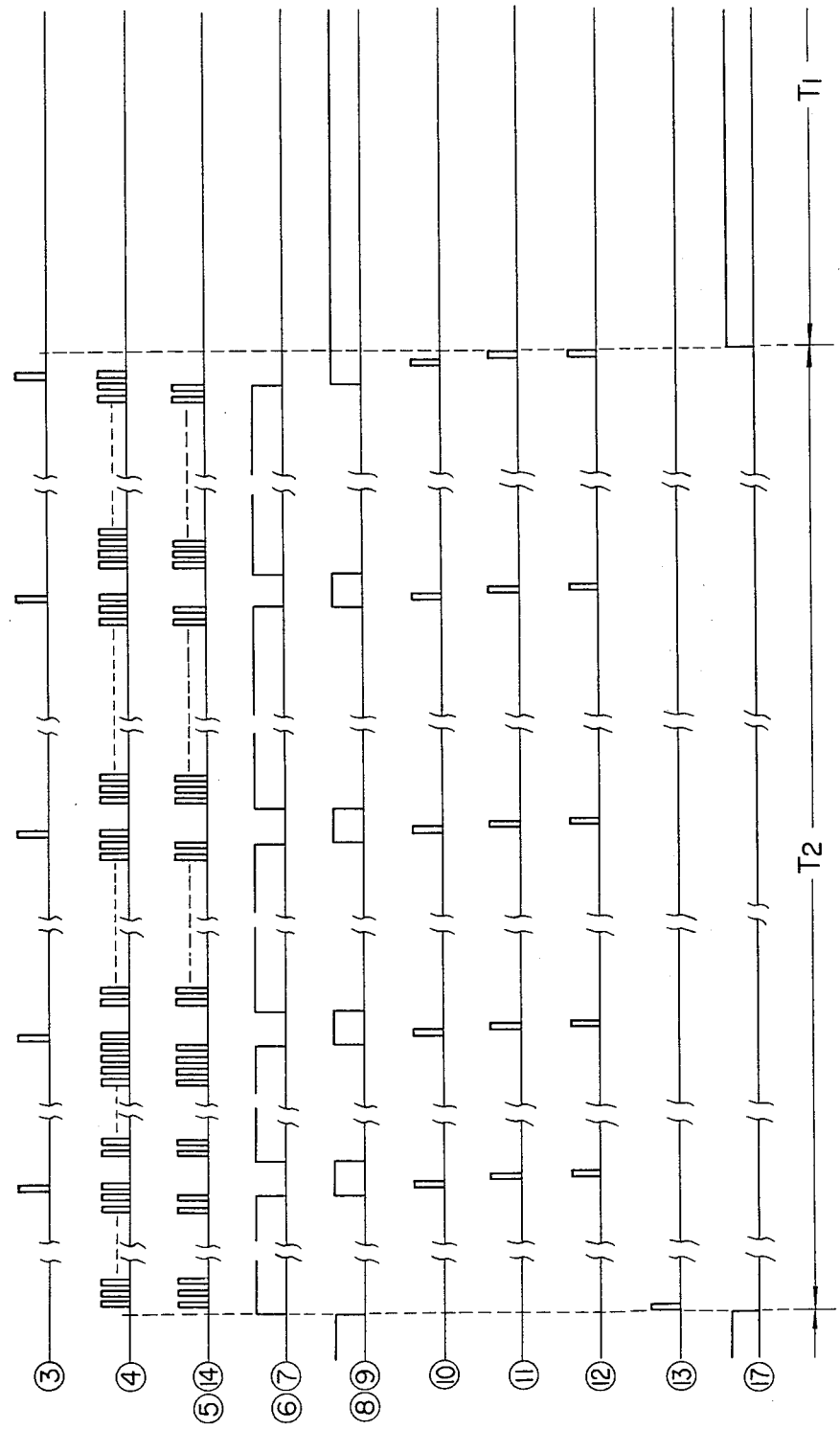

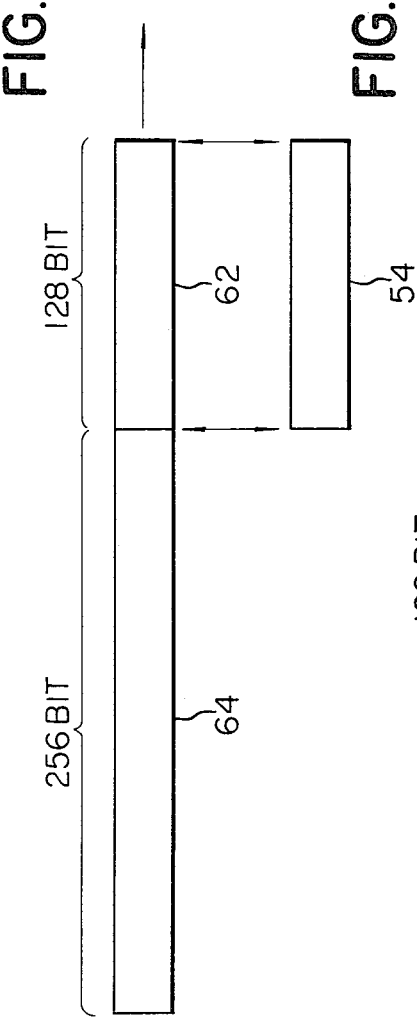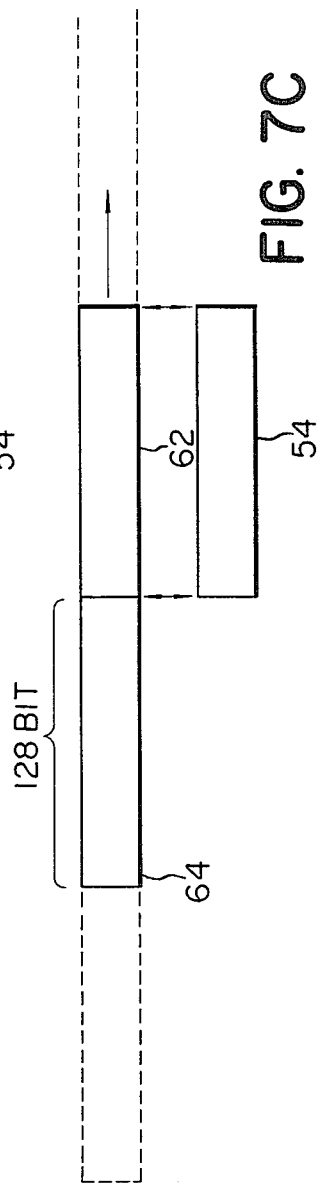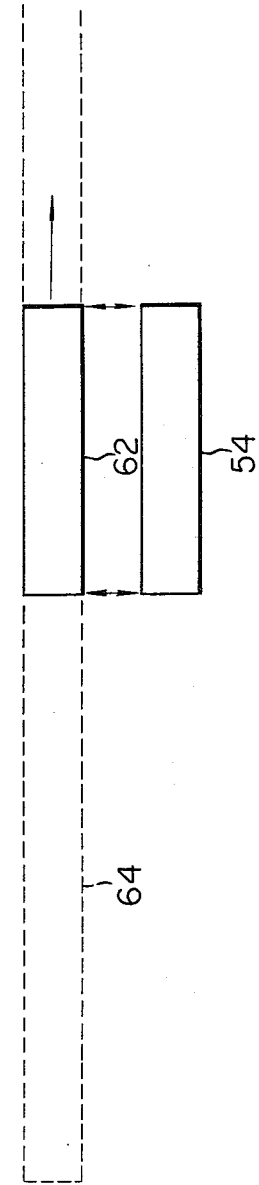

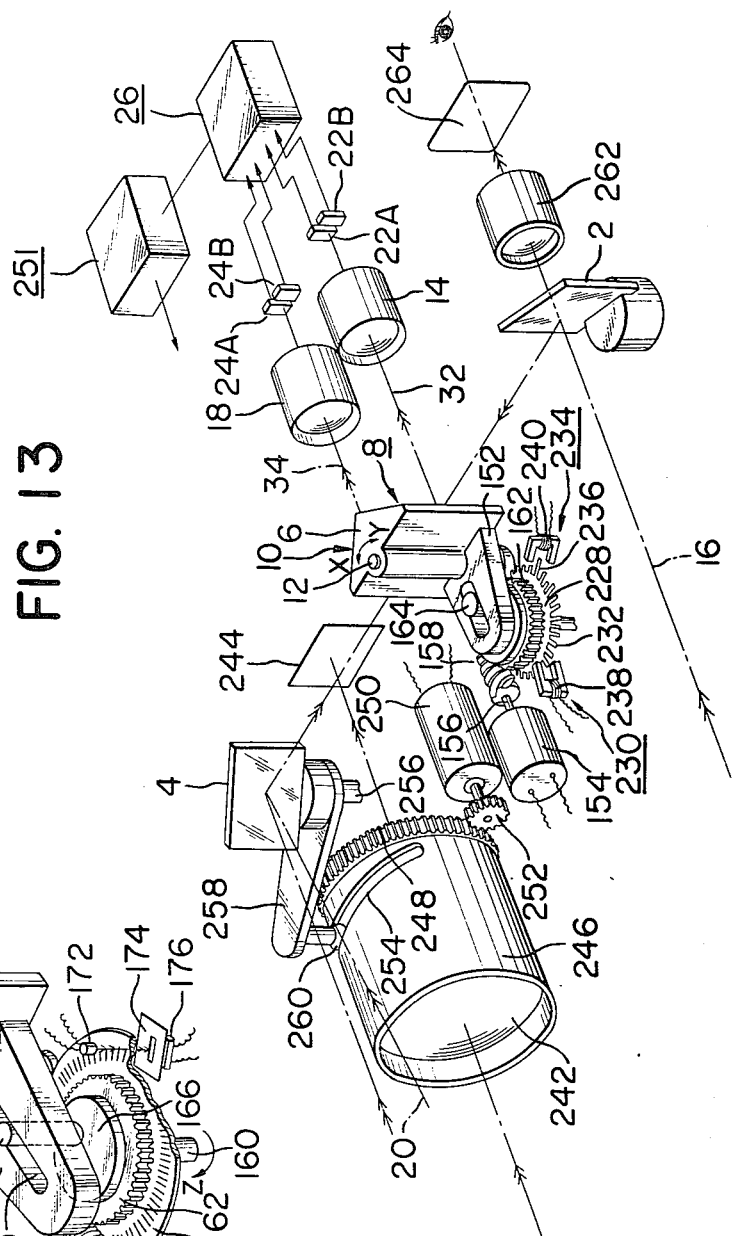
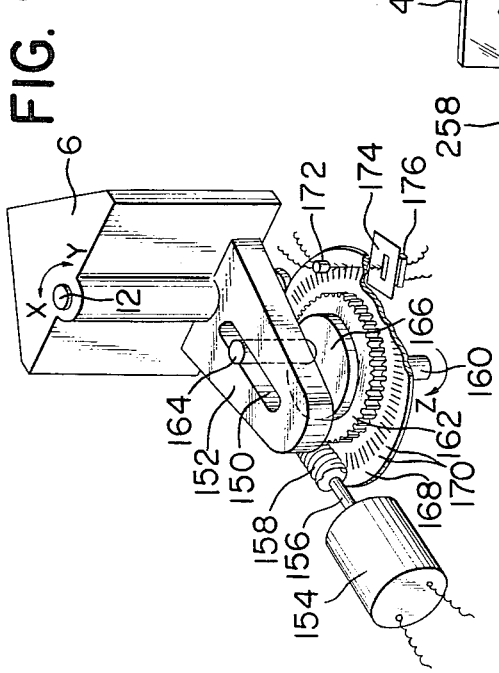

RANGE FINDING DEVICE

BACKGROUND OF THE INVENTION

1. Field of the Invention

This invention relates to a range finding device, and, more particularly, it is concerned with the range finding device of a type such that a distance to an object is measured by detecting electrically a relative quantity of discrepancy in space between two images in utilization of the distance measurement principle in a base line double-image coincidence type distance measurement meter. More specifically, the invention relates to a range finding device of a type, in which image scanning signals on the two images are obtained by scanning the abovementioned two images, based on which signals a relative quantity of spatial discrepancy between the two images may be detected.

2. Description of the Prior Art

There have so far been proposed various types of electric double-image coincidence detection type range finding devices as outlined in the preceding, or automatic focus adjusting devices for photographic cameras, etc. using such range finding devices. More specifically, this range finding device is of such type that two images of an object to be formed by a range finding optical system with a relative positional parallax corresponding to the object distance are received by photo-electric light receiving means, and quantities of relative positional parallax in these two images are found from outputs of the light receiving means obtained at this time, thereby calculating a distance to the object for the range finding.

For example, according to Japanese Patent Publication No. 48-5733 (published Feb. 20, 1973, for the invention of "An Automatic Focus Adjusting Device in a Camera" in the name of Canon Kabushiki Kaisha), there is proposed a range finding device in the form of an automatic focus adjusting device, wherein a pair of photo-conductive elements which are so constructed that their resistance values may vary in accordance with positional changes in an image on the light receiving surfaces thereof are juxtaposed, and then images of the same object are formed on these elements by means of a range finding optical system comprising a pair of focusing lenses fixedly disposed at a certain length on the base line so that a distance to the object may be detected by finding a difference in the resistance values between these two elements by utilizing the principle that a relative quantity of discrepancy in the image forming position on each element corresponds to a distance to the object.

In this disclosed device, however, the photo-conductive element per se is of a very peculiar structure, on account of which there inevitably take place various inconveniences in using a pair of these elements such that coincidence of the response characteristics in both elements in an ideal state becomes highly difficult, as the result of which precision in the detection becomes deteriorated due to increase in error signals, and false determination in distance will arise in the range finding due to coincidence of the resistance values in both elements in spite of a discrepancy in the relative positions of the images on both elements.

With a view to solving such problem, there has been proposed a range finding device, or an automatic focus adjusting device, in which image scanning signals on the two images are obtained by scanning them in utilization of a photo-electric light receiving means, and then by finding a quantity of relative positional parallax in these two images from the two images scanning signals, the object distance is calculated, or the focus adjustment of the objective lens system in a camera with respect to the object is automatically attained by utilizing informations concerning a relative positional parallax in these two images.

For example, U.S. Pat. No. 3,898,676 (filed Dec. 20, 1975, granted to Hosoe et al. for an invention entitled "Distance Detecting Device" assigned to Canon Kabushiki Kaisha) teaches an automatic focus adjusting device of a construction, wherein arrays of photo-sensors are used as the photo-electric light receiving means for receiving the two images, and, by driving these photo-sensor arrays simultaneously, a photo-electric output of each photo-sensor in the arrays is obtained in a timed sequence to thereby scan the two images simultaneously in a purely electrical manner, and image scanning signals to be obtained on these two images at this time are converted to wave form signals through low pass filters, after which these wave form signals are introduced into a phase discriminator to detect a phase difference between these image scanning signals, and a servo-motor is actuated by an output from the phase discriminator to cause the objective lens system to shift along its optical axis, in association with which one of the two images is shifted with respect to the other, whereby "in-focus position" of the objective lens system to the object is determined with a point where the phase difference between the image scanning signals for the two images becomes zero, in other words, a point where the relative positional parallax of the two images become zero.

Also, according to Laid-Open Japanese Patent Application No. 51-45556 (Laid-open on Apr. 19, 1976 for the invention of "Method and Apparatus for Distance Detection"), there is proposed a method and an apparatus for detecting distance of an object, which is constructed in such a manner that self-scanning image sensors (a kind of photo-sensor array) are utilized as the photo-electric light receiving means for receiving two images, that the two images are repeatedly scanned by these image sensors, at which time coincidence and non-coincidence of the image scanning signals on the two images to be obtained from the image sensors are detected by means of a coincidence detection circuit, while a timing for commencing scanning of one of the image sensors is varied by a variable delay circuit against a timing for commencing the scanning of the other image sensor, and that the relative positional parallax quantities of the two images, i.e., the object distance is made known directly from a lagged quantity between the timings for starting the scanning operations by the two image sensors which has been found upon detection of the coincidence of the abovementioned image scanning signals by the abovementioned coincidence detection circuit.

In the devices and methods as disclosed in these U.S. Pat. No. 3,898,676 and Laid-Open Japanese Patent Application No. 51-45556 there are used, as the photo-electric light receiving means, photo-sensor arrays or image sensors known as, in particular, Photo-Diode Array, CCD (Charge Coupled Device), BBD (Bucket Brigade Device), and so forth in order to obtain an image scanning signal relative to the two images by scanning the two images of the object to be formed by the range finding optical system. Although these photo-sensor arrays or image sensors have become widely available at a relatively cheap price thanks to recent development in the semiconductor technology, they are still at an expensive level in the overall manufacturing cost, so that the devices incorporating these photo-sensor arrays or image sensors are not yet free from the practical disadvantage of high price. In these devices, if there exists non-uniformity in the characteristic properties of the multitude of the photo-sensors in the photo-sensor arrays or image sensors to be used, such non-uniformity constitutes the direct and primary cause for decreasing precision in the range finding operation. Each and every photo-sensor in the photo-sensor arrays or image sensors should have a uniform and high quality characteristic, which would, however, lead to a further increase in the price of the apparatus.

In contrast, as taught in U.S. Pat. No. 3,553,455 (filed Feb. 26, 1969, granted to Ohtake et al. for the invention entitled "Automatic Focusing Apparatus by Means of Phase Discrimination"), if the two images are scanned by the use of a mechanical vibrating slit, it is only sufficient that a single photo-electric element is made to correspond to each image with the consequence that the inconvenience following the use of the photo-sensor arrays or image sensors as described above can be eliminated. Any way, these devices as heretofore been proposed are of such type that any phase difference in the image scanning signals relative to the two images is detected simply by the phase discriminator upon obtaining of the image scanning signals, so that these devices are considerably devoid of fidelity in range finding precision, hence the focus adjusting operations inevitably become inaccurate, even when they are adopted as the automatic focus adjusting device in photographic cameras, and also, from the standpoint of the construction of the signal processing circuit, there arise various practical inconveniences. For example, in the device proposed in the above-described U.S. Pat. No. 3,898,676, as already mentioned above, the image scanning signals are converted to the waveform signals by causing them to pass through low pass filters, after which the waveform signals are introduced into the phase discriminator, where detection is conducted to find whether any phase difference has occurred between the two signals. In this case, since the phase discriminator deals with the waveform signals, in particular, the overall construction of the device becomes complicated, and, since its reliability is lacking, it is not possible to accurately detect the phase difference when the phase difference is extremely small, on account of which the operation of the phase discriminator as the automatic focusing device is unavoidably inaccurate. Similarly, in the device as proposed in U.S. Pat. No. 3,553,455, too, the image scanning signals to be obtained from the abovementioned photo-electric elements are converted to rectangular waveform signals by amplifying them to a saturation level by means of amplifying circuits, and then, by processing the rectangular waveform signals on the basis of a reference signal associated with vibration of the abovementioned vibrating slit by means of a phase discriminating circuit consisting of a combination of differential circuits, "AND" gates, and "NAND" gates, a signal corresponding to the phase advance or phase delay is obtained. In this device, however, as the differential circuit is particularly used in the construction of the phase discriminating circuit, the precision in the phase discrimination cannot be satisfactorily guaranteed, so far as accurate "rectangular" waveform signals exactly corresponding to the patterns of the two images are not obtained by the abovementioned amplifying circuit. As the result, in the light of the fact that such accurate "rectangular" waveform signals are practically very difficult to obtain, the phase discriminator is lacking its reliability in the precision of its phase discrimination, and, in particular, from the standpoint of the problems such as noise signals, etc. which occur unavoidably at the time of converting the image scanning signals on the two images to the "rectangular" waveform signals. Incidentally, in the device as taught in this U.S. Pat. No. 3,553,455, the signals corresponding to the advance phase or the delay phase to be produced as the outputs from this phase discriminating circuit are used, as they are, as the signals for the forward and reverse rotations of the servo motor to thereby cause one of the two images to shift with respect to the other by this servo motor until the phase discrepancy can be eliminated. At this time, by axially shifting the objective optical system in association with the image shifting, the automatic focus adjustment in the objective lens system can be attained. According to this phase discriminating circuit construction adopted in this prior art patent, the relative positional parallax of the two images is eliminated, and both forward rotation signal and reverse rotation signal are simultaneously imparted to the servo-motor upon elimination of the phase discrepancy between the image scanning signals with the consequence that there takes place such inconvenience that the adjustment in the objective lens system becomes uncertain due to the so-called "hunting" phenomenon which occurs in the vicinity of the "in-focus position" of the objective lens system.

Incidentally, in the device as proposed in the above-discussed Laid-Open Japanese Patent Application No. 51-45556, there is merely adopted a differential amplifier or a combination of the differential amplifier and a comparator as the circuit for detecting coincidence and non-coincidence of the two image scanning signals. Considering, however, that the signals which the circuit deals with are time sequential signals to be produced, as an output, from the image sensors, it is almost impossible to carry out detection of the coincidence and non-coincidence of the image scanning signals with such simple circuit construction. Accordingly, it is not at all possible to expect such distance detection of high precision.

To add more, in the device as proposed in the above-discussed U.S. Pat. No. 3,553,455, since the two images are scanned by utilizing the vibrating slits, it has a definite advantage in that the light receiving means as required can only be a pair of photo-electric elements. However, as has been well recognized in the field of optical technology in general, when the slit is used, an effect due to its diffracted light becomes a large problem, so that, with this proposed device, there exists such inconvenience that deterioration in the range finding precision cannot be avoided owing to possible mixing of noise signals in the output signals in each photo-electric element caused by this diffracted light.

SUMMARY OF THE INVENTION

Thus, the present invention has been made with a view to eliminating various disadvantages inherent in the conventional range finding devices as mentioned in the foregoing. That is, the principal object of the invention is directed to provide an improvement in an image scanning, electrical double-image coincidence detection type range finding device, or more, specifically, a range finding device of a type, in which two images of an object to be formed by a range finding optical system with a relative positional parallax corresponding to the object distance are scanned to obtain image scanning signals relative to the two images, and then a quantity of this relative positional parallax in these two images are found from these image scanning signals, with which the object distance is found.

It is therefore the primary object of the present invention to provide a novel range finding device which is perfectly free from all the inconveniences above-described, has a sufficiently guaranteed precision in the range finding operation, is capable of obtaining always reliable and accurate distance informations, is free from any difficulty at all in reduction into practice, and is capable of attaining always reliable and accurate focus detection or focus adjusting operation, even in case it is adopted in a semi-automatic or full automatic focus adjusting device in photographic cameras, and other optical apparatuses and appliances.

It is another object of the present invention to provide a novel range finding device, in which a quantity of the relative positional parallax in two images is detected with high precision through an entirely new signal processing method without relying on the phase discrimination method by a phase discrimination circuit as heretofore been practiced at the time of processing image scanning signals relative to the two images, thereby making it possible to obtain always reliable and accurate distance informations.

It is still another object of the present invention to further improve the precision in the range finding operation by digitally processing the abovementioned image scanning signals.

In order to attain these objects, the present invention proposes a new type of the range finding device, in which the image scanning signals relative to the two images are converted into digital values, after which these digital values are stored in first and second storing means, then coincidence and non-coincidence in these digitalized image scanning signals as stored in these first and second storing means are detected by coincidence detecting means, while one of the image scanning signals is caused to relatively shift bit by bit with respect to the other image scanning signal, and, at this time, a shift bit quantity, which is required until the image scanning signals on these two images may become optimally coincided, is counted, thereby finding out the object distance from the shift bit quantity as counted.

The device of the present invention is such that one of the two images is made a reference image and the other image is made a comparative image to be compared with the reference image. For this purpose, there is adopted such a method that a signal region to be dealt with relative to the reference image is made, for example, three times as large as a signal region to be dealt with relative to the comparative image so as to detect which signal portion in a series of image scanning signals relative to the comparative image is optimally coincided with the image scanning signal on the reference image. In practice, the method is such that, in the signal processing circuit, the abovementioned first and second storing means have mutually different bit number construction in correspondence to the signal regions to be dealt with relative to the reference image and the comparative image, wherein, from the standpoint of simplification of the comparative circuit construction, a recirculation type first shift register of a predetermined bit number construction is employed as the first storing means for storing the digitalized image scanning signal relative to the reference image so as to enable bit-by-bit serial comparison between the contents stored in the first storing means and the contents stored in the second storing means, and a set of the first shift register, a recirculation type second shift register of the same bit construction, and a non-recirculation type third shift register to store therein surplus signals, i.e., signals which cannot be stored in the second shift register are employed as the second storing means to store the digitalized image scanning signals on the comparative image, whereby, at the time of one recirculation of the stored contents in the first and second shift registers, the coincidence and non-coincidence of the contents are detected bit by bit, and, at the termination of this one recirculation, the contents of the third shift register is moved to the second shift register by one bit, after which this recirculation and comparison are repeated again and again. This method is highly advantageous in shortening the time required for this serial comparison process, when a predetermined quantity of signals are serially compared bit by bit, while one of the image scanning signals to be compared (major signals) are being relatively shifted bit by bit with respect to the other signal (minor signals) to be the reference signals.

Further, the device of the present invention does not adopt in sequentially carrying out comparison between the image scanning signals, a method, by which all the operations thereof are stopped at a time instant when the optimum coincidence numbers have been obtained up to that time but the entire image scanning signals on the comparative image are compared with the image scanning signals on the reference image continuously to the end, and, at every time the maximum coincidence numbers are obtained during this comparison, these maximum coincidence numbers and shift bit quantities at the time, when the maximum numbers were obtained, are stored, and at the termination of this comparison, the stored shift bit quantities are taken out and converted into the distance informations. This method is highly advantageous in making it possible to know exactly which portions of the image scanning signals on the two images coincide optimally.

It is another object of the present invention to provide a new type of a system, to which particular and sufficient considerations have been given as to the sequential control so that each operating element can be accurately controlled with respect to a systematic construction of the range finding device as a whole, and always accurate range finding operations can be carried out.

It is still another object of the present invention to provide a new form of a scanning system which is capable of further improving precision in the range finding operations by successfully eliminating various disadvantages such as increase in noise signals due to the use of the vibrating slit as has heretofore been done in scanning the two images formed by the range finding optical system.

To attain these objects, the present invention proposes a construction, in which the vibrating optical means is provided in the range finding optical system, in particular, and, with this optical means, the two images are caused to move at the same cycle and same phase on the photo-electric elements, of which the effective light receiving surface is limited to a few tens of $\mu$m in width, whereby the image scanning signals on the two images may be obtained from the photo-electric elements. This construction is very advantageous in that, in comparison with the case where the vibrating slits are adopted as has heretofore been done, it eliminates perfectly the problem of mal-effect due to the diffracted light, etc., and prevents mixing of the noise signals into the image scanning signals without failure to further improve the precision in the range finding operations. Also, since the photo-electric elements alone can be used as the photo-electric light receiving means, the price of the device can be advantageously reduced to a considerable extent in comparison with the case where the photo-sensor arrays or image sensors are used.

The foregoing objects, other objects, and the features of the present invention will become more apparent from the following detailed description thereof when taken in conjunction with the accompanying drawings.

BRIEF DESCRIPTION OF THE DRAWINGS

In the drawings:

FIG. 1 is a schematic diagram of one embodiment of the range finding device according to the present invention;

FIG. 2 is a time chart showing the principle of the operations of the device shown in FIG. 1;

FIG. 3 is a perspective view of one concrete example of a position detector used in the device of FIG. 1;

FIGS. 4, 4A and 4B are circuit diagrams showing one example of a signal processing circuit used in the device of FIG. 1;

FIGS. 5 and 6 are respectively time charts showing the operations of the signal processing circuits of FIG. 4, in which FIG. 5 shows the sampling sequence in particular, and FIG. 6 shows the processing sequence in particular;

FIGS. 7A and 7B are schematic diagrams explaining the function of the signal processing circuit shown in FIG. 4;

FIG. 9 is a perspective view showing another concrete example of the position detector in the device shown in FIG. 9;

FIG. 13 is a schematic construction diagram of one example of the automatic focus adjusting system in photographic cameras and other like optical apparatuses and appliances.

DETAILED DESCRIPTION OF PREFERRED EMBODIMENTS

Figure 4A:
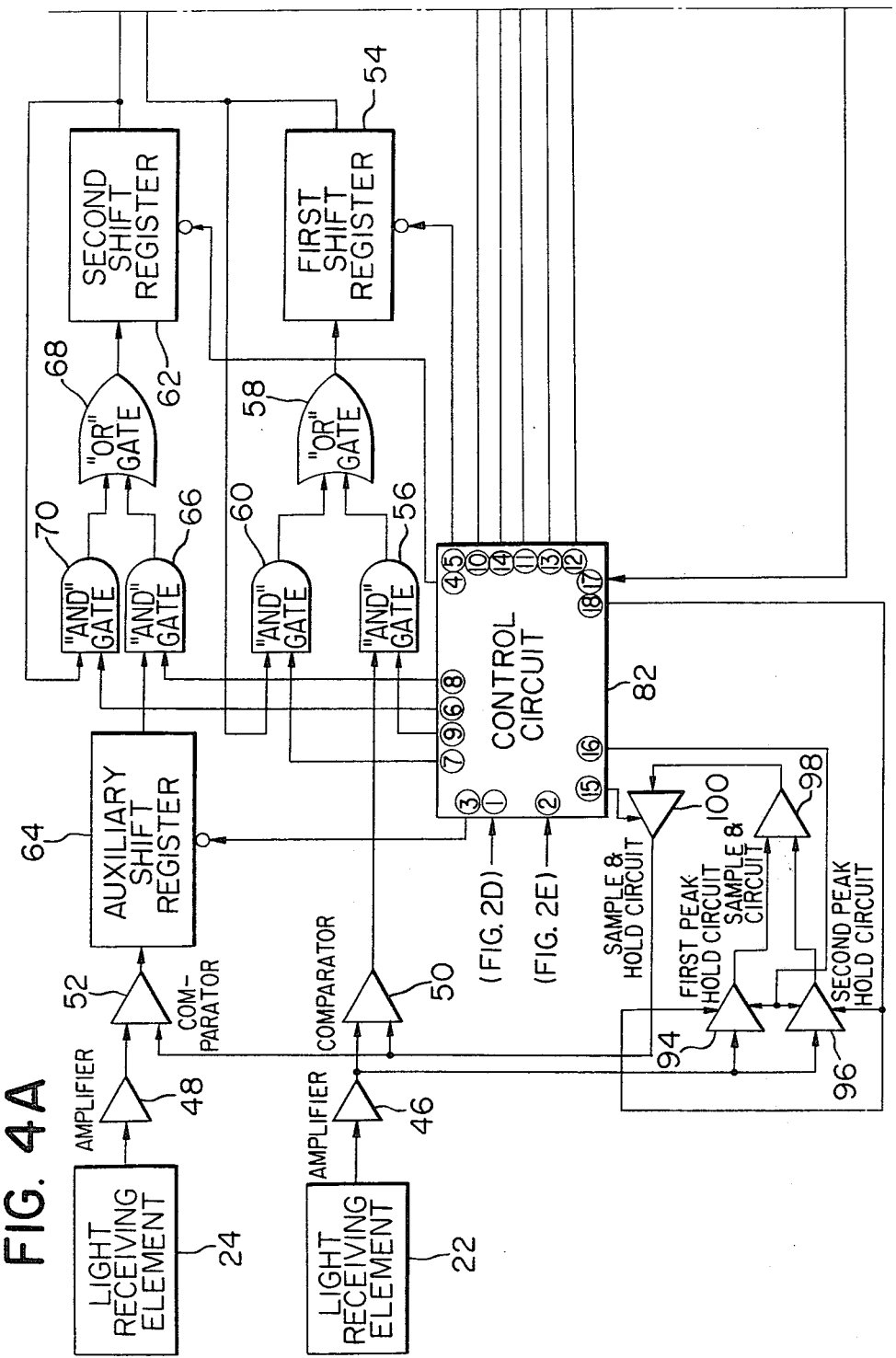

In the following, the present invention will be described in specific detail with reference to the accompanying drawings.

Referring, first to FIG. 1, one preferred embodiment of the range finding device according to the present invention will be explained for its general construction. The device shown in this figure of the drawing includes a first optical system to form a reference image and a second optical system to form a comparative image, wherein the first optical system consists of a first mirror 2, a first oscillating mirror 8, and a first optical lens 14, all being arranged in such a manner that the reference image may be formed on a plane containing a first light receiving element 22, and the second optical system consists of a second mirror 4, a second oscillating mirror 10, and a second optical lens 18, all being arranged in such a manner that a comparative image may be formed on a plane containing a second light receiving element 24. The first and second oscillating mirrors 8 and 10 are disposed, at a certain maintained angle $\alpha$ (90 degrees, for example), on an oscillating body 6 which oscillates in the direction of an arrow X–Y with a shaft 12 as the center of its oscillation, so that it may be oscillated in the same direction and same phase following the oscillation of the oscillating body 6. Also, each of the first and second light receiving elements 22 and 24 has a light receiving surface of a very limited width (for example, a few tens of $\mu m$ or so) and extending in the direction parallel to the center shaft 12 for oscillation of the oscillating body 6 (the direction normal to the drawing sheet). Accordingly, the reference image and the comparative image are substantially scanned by the light receiving elements 22 and 24, when the light receiving elements are moved in the direction substantially perpendicular to the direction of their extension with the oscillation of the oscillating body 6, whereby the image surface luminance distribution of each image is produced as an output from each of the light receiving elements 22 and 24 in the form of time-series signals, i.e., time sequential signals (hereinafter referred to as "scanning signals").

Incidentally, the center optical axis 20 of the second optical system intersects at one point between the infinitness and the proximity existing on the center optical axis 16 of the first optical system, and an adjustment is so made that, when an object exists at this intersection (hereinafter referred to as "a reference point"), there may be obtained scanning signals which can be regarded as being totally or substantially the same with the outputs from the first and second light receiving elements 22 and 24 from the standpoint of time and the output level. By the way, the term "center optical axes 16, 20 of the first and second optical systems" means the extended optical axes of the optical axes 32, 34 of the first and second lenses 14, 18 through the mirrors 8, 2 and the mirrors 10, 4, when the oscillating body 6 is at the center of its oscillation.

A reference numeral 28 in FIG. 1 designates a position detector to carry out detection of the oscillating position of the oscillating body 6, which generates a signal to be a reference or standard to recognize to which luminance signal from the positions of the reference image and the comparative image the output signals from the first and second light receiving elements 22, 24 belong, or, a reference signal to extract the luminance signal at a particular position of each image.

A reference numeral 26 designates a signal processing circuit which receives the signal from the position detector 28 and the output signals from the first and second light receiving elements 22, 24 as inputs, operates to determine to which direction and in what amount the output signal from the second light receiving element 24 is deflected with respect to the output signal from the first light receiving element 22, and applies this operated result to a display device 30 as a distance information.

In the following, explanations will be given of the operations of the device having the above-described construction, in reference to the signal waveform chart of FIG. 2.

Referring to FIG. 2, the oscillating body 6 shows its oscillations in the X-Y direction as in (a). The oscillations maintain substantially constant cycles such that it moves in the Y direction during a period of time $t_1$ to $t_2$, in the X direction during a period of time $t_2$ to $t_3$, and in the Y direction during a period of time $t_3$ to $t_4$, and so on. Accordingly, the reference image and the comparative image are subjected to scanning on their surfaces in both ways with the consequence that scanning signals as indicated by the waveforms in (h) and (i) are obtained from the light receiving elements 22 and 24.

In this embodiment, the device is so constructed that one oscillatory cycle of the oscillating body 6 is made one operational cycle for the distance detection, and the scanning signals of both reference image and comparative image are taken into the signal processing circuit 26 during the period indicated in (b) of FIG. 2, i.e., the period, during which the oscillating body 6 is moving in the X direction, or more particularly during the $T_1$ period, and the scanning signals are processed during the remaining $T_2$ period (as indicated in (c) of FIG. 2) to operate the distance to be found.

Explaining now the basic principle of the range finding according to this embodiment, the output scanning signals of the reference image and the comparative image are produced from the light receiving elements 22 and 24 during the period when the oscillating body 6 is moving toward the X direction, or more particularly, during $T_1$ period. In this case, if the object for the range finding is to a shorter distance side than the reference point, the scanning signals of the reference image are produced as output with an advanced phase to that of the comparative image, and if the object is to a longer distance side than the reference point, the scanning signals of the reference image are produced as output with a delayed phase to that of the comparative image, and if the object is on the reference point, both scanning signals are output with the same phase. Phase difference between both scanning signals corresponding to a distance deviation to the shorter distance side or longer distance side with respect to the reference point. Since this principle is the same as that of the range finding device of double image coincidence type in general, no further details will be given.

The present embodiment is to obtain distance informations by carrying out phase comparison between both scanning signals with use of the scanning signal of the reference image to be extracted during the period $T_3$ shown in (g) of FIG. 2 and the scanning signal of the comparative image to be extracted during the period $T_1$ shown in (f) of FIG. 2 with the time instant when the oscillating body 6 passes by the center of its oscillation as the substantial center for the comparison. Although to be described later, this distance information output is obtained by digitally operating with which signal portion having what extent of phase lag the scanning signal extracted during the period $T_3$ may coincide.

Also, to be described later, the position detector 28 is so constructed that a pulse output as shown in (d) of FIG. 2 may be obtained at the time instant when the oscillating body 6 has turned to the extreme end in the Y direction, and that a pulse output as shown in (e) of FIG. 2 may be obtained at an oscillatory phase position of the oscillating body 6 corresponding to the time instant when the period $T_1$ commences. It should be noted here that the period $T_1$ is governed in its commencing timing by the pulse shown in (e) of FIG. 2, and the period $T_3$ is governed in its commencing timing by a time instant which has lapsed for a certain definite time from the pulse in (e). Incidentally, although the pulses a and b in (e) of FIG. 2 are produced as the outputs at the same oscillatory phase position of the oscillating body 6 when it oscillates in the X direction and in the Y direction, respectively, the pulse in (d) of FIG. 2 is used as the signal for extracting the pulse b alone during the oscillation of the body 6 in the X direction. Moreover, the time control of the periods $T_1$ and $T_3$ is all done by calculating a clock pulse of a certain definite cycle as shown in (j) of FIG. 2 from the commencing time instant of the period $T_1$, i.e., after the output pulse b in (e) of FIG. 2 has been produced. On the other hand, however, this clock pulse may also be used as a sampling pulse for extracting the reference image and the comparative image.

Referring now to FIG. 3, a concrete construction of the abovementioned position detector 28 will be explained. The position detector in this embodiment comprises a semicircular thin plate 32 of ferromagnetic material which rotates in accompaniment with the oscillating body 6 with the rotational shaft 12 of the oscillating body 6 as its center of rotation, and a detecting part 36 which detects a notched portion 34 formed on the outer peripheral part of the thin plate 32. The detecting part 36 comprises a U-shaped member of a ferromagnetic material having an exciting winding 38 and a detecting winding 40 wound therearound. The detecting part is disposed in such a manner that this plate 32 may be positioned between the two forks of the U-shaped member, and is magnetized by electric conduction from a direct current power source 42 to the exciting winding 38. In this construction, if the notched portion 34 formed on the outer peripheral part of the thin plate 32 and the detecting part 36 do not meet each other, while the oscillating body 6 is oscillating in the X-Y directions, no change occurs in the magnetic field the detecting part 36 forms. However, at a moment when this notched portion 34 passes through the detecting part 36, there takes place instantaneous change in the magnetic field, and an electric current flows from the detecting winding 40 through a capacitor 44. This current is taken into the signal processing circuit 26 and converted to the position detecting signals as shown in (d) and (e) of FIG. 2 for use in the position detection.

In the construction shown in FIG. 3, a single detecting part 36 is illustrated. Actually, however, a plurality of detecting parts may be provided in correspondence to required numbers of position detecting signals so as to obtain signals as shown in (d) and (e) of FIG. 2 at the respective positions where the oscillating body 6 is at the maximum oscillating position in the Y direction, where the period $T_1$ commences, and where the body is at the oscillating center phase position, and so forth.

Referring to FIG. 4, one embodiment of the signal processing circuit in the abovementioned range finding device will be explained. In the drawing, a reference numeral 46 designates an amplifier for amplifying an output signal from the first light receiving element 22, a reference numeral 48 indicates an amplifier for amplifying an output signal from the second light receiving element 24, a numeral 50 a comparator for converting an output signal from the amplifier 46 into a two-value signal, 52 designates a comparator for converting an output signal from the amplifier 48 into a two-value signal, 54 refers to a recirculation type first shift register which is capable of taking thereinto an output from the comparator 50 through an "AND" gate 56 and an "OR" gate 58, and of recirculating the content of the signal as taken in through an "AND" gate 60 and an "OR" gate 58, a numeral 62 refers to a recirculation type second shift register which is capable of taking thereinto an output from the comparator 52 through an auxiliary shift register 64, an "AND" gate 66, and an "OR" gate 68, and of recirculating the content of the signal as taken thereinto through an "AND" gate 70 and the "OR" gate 68, a reference numeral 72 designates an exclusive "NOR" gate which produces an output signal "1" when the outputs from both first and second shift registers 54 and 62 become coincided, and produces an output signal "0" when both outputs are not coincided, a numeral 74 refers to an "AND" gate which receives a clock pulse same as the clock input from the first shift register 54 and an output from the exclusive "NOR" gate 72, and which produces a pulse output, only when an output from the exclusive "NOR" gate 72 is "1," a numeral 76 refers to a counter which counts an output pulse from the "AND" gate 74 by introducing as an input the output pulse from the "AND" gate 74 through a count terminal C, a reference numeral 78 designates a latching circuit to latch an output from the counter 76, a numeral 80 designates a digital comparison circuit which compares the content of the counter 76 and the content of the latching circuit 78, and produces an output signal through a terminal S when the content of the counter 76 is greater than the content of the latching circuit 78, a reference numeral 82 designates a control circuit which produces various output timing pulses and control signals so as to perform the overall sequence control, a numeral 84 denotes an "AND" gate which refers to an output from the digital comparison circuit 80 by a signal from a terminal ⑩ in the control circuit 82, a numeral 86 indicates a counter which receives an output pulse from a terminal ⑫ in the control circuit 82 at its terminal C, and counts the pulse, a numeral 88 designates a decoder which produces an output signal "1" when the content of the counter 86 reaches a certain definite value and imparts this value to a terminal ⑰ in the control circuit 82, a reference numeral 90 designates a latching circuit to latch the content of the counter 86 on the basis of a signal from the "AND" gate 84, a reference numeral 92 indicates a reference table circuit which converts the content of the latching circuit 90 into a distance information, a numeral 94 refers to a first peak hold circuit which samples and holds the maximum output value from the amplifier 46, a numeral 96 refers to a second peak hold circuit which samples and holds the minimum output value from the amplifier 46, a numeral 98 designates an operational circuit which operates a sum of the outputs from the first and second peak hold circuits 94 and 96, and produces an output of half a level, and a numeral 100 refers to a sample and hold circuit which samples and holds an output from the operational circuit 98.

In the abovementioned construction, the shift register 54 is for taking thereinto the reference image in the form of a two-value, and the shift registers 62 and 64 are combined into a single shift register as a whole which serves for taking thereinto the comparative image in the form of a two-value. The counter 76 is one which counts out for how many bits the contents of the shift registers 54 and 62 have become coincided during one recirculation of these shift registers. Also, digital comparison circuit 80 and the latching circuit 78 are provided for taking thereinto the maximum value from the counter 76. The first and second peak hold circuits 94 and 96, the operational circuit 98, and the sample and hold circuit 100 are for establishing a slice level, wherein a mean value of the maximum output value and the minimum output value of the first light receiving element 22 to be obtained during the period $T_3$ which recurs at every oscillatory cycle of the oscillating body 6 is operated so as to make this mean value a slice level at the time of converting the outputs from the first and second light receiving elements 22 and 24 into two-value signals.

In such construction, there are two major operating periods, as already mentioned in the foregoing, i.e., the sampling period as denoted by $T_1$ and the processing period as denoted by $T_2$ in FIG. 2. In both sampling period $T_1$ and the processing period $T_3$, as the cycle of the clock pulse imparted from the control circuit 82 to each of the shift registers 54, 62, and 64 is considerably different, which makes it difficult to represent this cycle on the same time chart, so that the operations in the sampling period $T_1$ are represented in the time chart of FIG. 5, and the operations in the processing period $T_2$ are represented in the time chart of FIG. 6.

To a terminal ① of the control circuit 82, the pulse in (d) of FIG. 2 is imparted, and to a terminal ② thereof, the pulse in (e) of FIG. 2 is imparted. On the other hand, clock pulses to the shift registers 64, 62, and 54 respectively are sent out from terminals ③, ④, and ⑤ of the control circuit 82, gate control signals to the "AND" gates 70, 60, 66, and 56, respectively are sent out from terminals ⑥, ⑦, ⑧, and ⑨, a reference signal to the "AND" gate 84 which refers to the S terminal output of the digital comparison circuit 80 is sent out from terminal ⑩, a reset signal to a reset terminal R of the counter 76 is sent out from a terminal ⑪, a counte pulse to a count terminal C of the counter 86 is sent out from a terminal ⑫, a reset signal to each of the reset terminals R of the counter 86 and the latching circuit 78 is sent out from a terminal ⑬, a pulse signal same as the output pulse from the terminal ⑤ is sent out from a terminal ⑭ only during the processing period $T_2$, and control signals to the first and second peak hold circuits 94 and 96 and the sample and hold circuit 100 are sent out from terminals ⑮, ⑯, and ⑱. The input and output timings at each of the terminals are as shown in FIGS. 5 and 6. In order to perform such timing controls, the control circuit 82 should be composed of an oscillation circuit, a counter, a frequency dividing circuit, gates, and so on, the details of which will be described at a later paragraph.

In this embodiment, it should be understood that 384 times of sampling operations are conducted during the period $T_1$ shown in FIG. 2, i.e., the sampling time of the comparative image so as to obtain 384 luminance distribution signals, and, at the same time, 128 times of sampling operations are conducted during the period $T_3$, i.e., the sampling time of the reference image so as to obtain 128 luminance distribution signals. It goes without saying that this period $T_1$ is three times as long as the period $T_3$, at which time the period $T_3$ is made to be just at an intermediate position of the period $T_1$.

Based on the abovementioned premises, it is understood that the shift registers 54 and 62 are to take the 128-bit construction, while the shift register 64 is to take the 256-bit construction. Further, when the oscillating cycle T of the oscillating body 6 is 160 msec., the period $T_1$ is 48 msec., and the period $T_2$ is 112 msec., the pulse cycle for sampling the reference image and the comparative image becomes 48/384 msec., i.e., 8 kc. On the other hand, during the processing period, as the 128 sampling data of the reference image should be compared with the comparative image for 256 times, a timing pulse of at least 112/128 × 256 msec., i.e., approximately 30 kc, needs be used.

In the following, the operations of the circuit of the construction shown in FIG. 4 will be explained in reference to the timing charts shown in FIGS. 5 and 6. It is to be noted that the encircled numerals at the left side in each figure of the drawing correspond to the input and output terminals of the control circuit 82.

Now, as shown in FIG. 5, when an input pulse is applied to the terminal ① of the control circuit 82 from the position detector 28 indicating that the oscillating body 6 is at the maximum oscillating position in the Y direction, and then another input pulse indicating a sampling starting point is applied to the terminal ②, the entire system enters into the sampling period. During this sampling period, an output "1" is given from the terminals ⑧ and ⑨ of the control circuit 82 to render the "AND" gates 56 and 66 conductive, and, at the same time, an output "0" is given from the terminals ⑦ and ⑥ to control the "AND" gates 60 and 70. Accordingly, the shift registers 62 and 64 are connected mutually through the "OR" gate 68 with the result that both are combined into a single shift register to take thereinto an output from the comparator 52 in synchronism with a clock pulse imparted from the terminals ③ and ④ of the control circuit 82. The taking of the data to these shift registers 62 and 64 commences simultaneously with start of the sampling period $T_1$. These data are those that have been converted into a two-value from the scanning signals of the comparative image obtained at the light receiving element 24 in the comparator 52 based on the slice level obtained during the previous oscillating cycle.

As soon as the number of times of the data taking into the shift registers 62 and 64 reaches 128 times, and the taking operation enters into the 129th, a pulse output exactly the same as those outputs at the terminals ③ and ④ is commenced from the terminal ⑤ of the control circuit 82 to the shift register 54, whereby the data taking operation to the shift registers 54 starts. The data taking operation to this shift register 54 is performed only during the period $T_3$. The data are those that have been converted into a two-value from the scanning signal of the reference image obtained at the light receiving element 22 in the comparator 50 based on the slice level obtained during the previous oscillating cycle. Incidentally, the number of times of the data taking into this shift register 54 is 128 times, and thereafter supply of the clock pulse from the terminal ⑤ of the control circuit 82 is stopped.

On the other hand, the data taking operations into the shift registers 62 and 64 are still continued, and when the number of times of the data taking reaches 384 times, supply of the clock pulse to the shift registers 64 and 62 from the terminals ③ and ④ of the control circuit 82 is stopped, and a pulse output indicating termination of the sampling period is sent out from the terminal ⑬ simultaneously.

Incidentally, during the processing period $T_2$, if the content of the counter 86 (to be described later) takes a definite value at the termination of the entire processing, an output "1" is produced from the decoder 88 and imparted to the terminal ⑰ of the control circuit 82 to stop the processing operations, thereby bringing the circuit to a waiting period for the sampling $T_1$. When an output from the decoder 88 to the terminal ⑰ of the control circuit 82 becomes "0," the processing operation begins. That is to say, when an output signal indicating termination of the sampling is produced from the terminal ⑬ of the control circuit 82 to reset the counter 86, the system immediately goes into the processing operation.

Incidentally, during the sampling period $T_1$, the control signals as shown in FIG. 5 are applied from the terminals ⑱, ⑯, and ⑮ of the control circuit 82 to the first and second peak hold circuits 94 and 96, and the sample and hold circuit 100, respectively. In other words, during the taking of the reference image data from the terminal ⑱ of the control circuit 82, i.e., the period $T_3$, sampling signals of "0" level are applied to the first and second peak hold circuits 94 and 96 to store the maximum and the minimum peak values therein during that period, and, in other period, the hold signals of "1" level are applied thereto to hold the abovementioned stored value. By the way, immediately prior to application of the input sampling signals, reset pulses are applied to both peak hold circuits 94 and 96, respectively, from the terminal ⑯ of the control circuit 82. On the other hand, a control signal is imparted to the sample and hold circuit 100 from the terminal ⑮ of the control circuit 82. In other words, while the comparative image and the reference image are being taken in, i.e., during the period $T_1$, a hold signal of level "1" is imparted to the circuit 100 to hold the slice level obtained during the previous oscillating cycle, and, during the remaining period $T_2$, an output signal of the operational circuit 98 is sampled by a sampling signal of level "0". More specifically, the sample and hold circuit 100 serves to feed a mean value of the maximum and minimum values which were sampled during the period $T_3$ preceding one oscillating cycle to the comparators 50 and 52 in the course of the period $T_1$ in the current oscillating cycle. On the other hand, during the period $T_3$ in the current cycle, the first and second peak hold circuits 94 and 96 sample the new maximum and minimum values and hold them until the next oscillating cycle. Subsequently, when the output of the encoder 88 becomes "0," an input at the terminal ⑰ of the control circuit 82 becomes "0", whereby the whole system enters into the processing period $T_2$ and the processing operations begins.

During this processing period $T_2$, an output at the terminal ⑨ of the control circuit 82 becomes "0" and an output at the terminal ⑦ becomes "1," initially, as shown in FIG. 6, with the consequence that the contents of the shift register 54, i.e., the two-value signals of the reference image in 128-bit construction, become recirculable through the "AND" gate 60 and the "OR" gate 58. On the other hand, since an output at the terminal ⑧ of the control circuit 82 becomes "0" and an output terminal ⑥ thereof becomes "1", at the initial stage, the contents of the shift register 62, i.e., only the 128 bits stored in the shift register 62 out of the two-value signals of the comparative image in the 384-bit construction, become recirculable through the "AND" gate 70 and the "OR" gate 68.

On the other hand, at the commencement of this processing period $T_2$, the counters 76 and 86 are both in the reset conditions, the contents of which are "0." Also, the latching circuit 78 is in the reset conditions at the commencement of the processing period $T_2$, the content of which is "0." In more detail, at the end of the previous processing period, the signal "1" is imparted to the reset terminal R of the counter 76 from the terminal ⑪ of the control circuit 82, as shown in FIG. 6, and, at the end of the sampling period $T_1$, the reset pulse output from the terminal ⑬ of the control circuit 82 is applied to the reset terminals R of the latching circuit 78 and the counter 86, respectively.

During the processing period $T_2$, 128 clock pulses are consecutively applied at first to the shift registers 54 and 62, and the "AND" gate 74 from the terminals ④, ⑤, and ⑭ of the control circuit 82, as shown in FIG. 6. Through this operation, the contents of the shift registers 54 and 62 complete their one recirculation. During this recirculating operation, however, an output "1" is produced from the exclusive "NOR" gate 72 when the outputs from both shift registers 54 and 62 are coincided, and an output "0" is produced therefrom when both outputs are not coincided. In this consequence, a single pulse output is produced from the "AND" gate 74 only when each bit of the output from both shift registers 54 and 62 becomes coincided. As the result, it follows that the counter 76 counts up only those number of times where the bits coincided each other out of those compared outputs for the 128 bits in both shift registers 54 and 62, whereby the counted quantities which have been accumulated in the counter 76 during the one recirculation of the shift registers 54 and 62 become the coincided bit number out of the 128 bits in the shift registers 54 and 62.

The counted quantities of the abovementioned counter 76 are constantly applied to the digital comparison circuit 80, and, when the quantity becomes larger than the content of the latching circuit 78, output "1" is produced from the terminal S of the comparison circuit 80. However, as the output from this terminal S of the comparison circuit 80 is sensed by an output reference pulse from the terminal ⑩ of the control circuit 82 at the "AND" gate 84, an input pulse is applied to the terminal L of the latching circuit 78 when the output from the terminal S is "1," and the counted quantity of the counter 76 is taken into the latching circuit 78 as it is. On the other hand, the output from the abovementioned "AND" gate 84 is also applied to the terminal L of the latching circuit 90, so that, when an output pulse is produced from the "AND" gate 84, the latching circuit 90 takes thereinto the content of the counter 86, and store the same. In short, the latching circuit 90 is provided for storing the content of the counter 86 when the content of the counter 76 becomes so large in comparison with the content of the latching circuit 78 that the content of the counter 76 needs be transferred to the latching circuit 78. Thereafter, the abovementioned counter 76 is reset by an output reset pulse from the terminal ⑪ of the control circuit 82, and assumes a "0" content. On the other hand, the counter 86 is counted up for "1" by an output pulse from the terminal ⑫ of the control circuit 82 with the same timing as that of this reset pulse.

Upon completion of one recirculation of the contents of the shift registers 54 and 62, the output from the terminal ⑥ of the control circuit 82 becomes "0," while the output from the terminal ⑧ becomes "1," whereby the "AND" gate 70 is controlled, and the "AND" gate 66 becomes conductive. In this state, a single clock pulse is imparted to each of the shift registers 64 and 62 from the respective terminals ③ and ④ to cause all the contents in the shift registers 64 and 62 to be shifted to the right for 1 bit. Through these operations, the rightmost bit in the shift register 62 is dropped, and the rightmost bit in the shift register 64 newly enters into the leftmost bit in the shift register 62. After this operation, outputs from the terminals ⑥ and ⑧ of the control circuit 82 becomes "1" and "0," respectively, and the content of the shift register 62 is again brought to a recirculable condition. In shifting the contents of these shift registers 64 and 62 for 1 bit, outputs from the terminals ⑦ and ⑨ of the control circuit 82 become also "0" and "1," respectively, same as the outputs at the terminals ⑥ and ⑧, as shown in FIG. 6, whereby and "AND" gate 60 is controlled against the shift register 54, and the "AND" gate 56 becomes conductive. In this shifting operation, however, no output pulse is produced from the terminal ⑤ of the control circuit 82 to the shift register 54, hence the content of the shift register 54 remains fixed during the 1 bit shifting operation of the contents of the shift registers 64 and 62. After this operation, the outputs from the terminals ⑦ and ⑨ same as those from the terminals ⑥ and ⑧, become "1" and "0," respectively, and the content of the shift register 54 is again brought to a recirculable condition.

After the abovementioned series of operations, the same operations are repeated in the same manner so as to sequentially compare the 128-bit contents of the shift register 54 and the 128-bit contents of the shift register 62 by means of the exclusive "NOR" gate, count the coincided numbers by the counter 76, determine by the digital comparison circuit whether the coincided numbers are greater than the previous coincided numbers or not, store the values of the coincided numbers in the latching circuit 78, if they are larger, and store the content of the counter 86 at that time in the latching circuit 90. Incidentally, the content of the counter 86 corresponds to the shift bit numbers in shifting the contents of the shift registers 64 and 62 to the right at every time the content of the shift register 62 is recirculated. Accordingly, it is the shift bit number at the time when the maximum values so far were counted at the counter 76 that is latched in the latching circuit 90.

The abovementioned operations are repeated for 256 times until the 256-bit content in the shift register 64 will have been entirely shifted to the leftmost bit in the shift register 62. Subsequently, the content of the counter 86 is counted, and, as soon as it becomes "257," the counting operation is stopped. In more detail, as shown in FIG. 6, at every time the contents of the shift registers 64 and 62 are shifted to the right for 256 times, the coincided bit numbers in the contents of the shift registers 54 and 62 are counted, and, after the rightward shifting of the 256th bit, the counting of the coincided bit numbers by the counter 76, detection of the maximum value by the digital comparison circuit 80, and the latching operation of the maximum value to the latching circuit 78 are performed. Subsequently, when the counter 86 performs counting by the output from the terminal ⑫ of the control circuit 82, the content of the counter 86 assumes "257," and the decoder 88 detects this "257" to produce the output "1." The control circuit 82 which received this output "1" at its terminal ⑰ immediately stops its processing operations and assumes a waiting condition for the sampling period.

Through the foregoing operations, there are stored in the latching circuit 90 the right shift bit numbers in the shift registers 64 and 62 at the time when the coincided bit numbers in the contents of the shift registers 54 and 62 are the maximum. These right shift bit numbers become the basis for the distance information.

Illustrating the above-described operations in FIG. 7, a state, wherein the shift registers 64 and 62 have received therein not a single right shift bit is shown in (a), a state, wherein the registers have received 128 right shift bits, is shown in (b), and a state, wherein the registers have received 256 right shift bits, is shown in (c). In the course of the right shifting from (a) to (b) of FIG. 2, when a situation takes place, in which the coincided bit numbers in the contents of the shift registers 54 and 62 become maximum, this indicates that the comparative image has been sampled with an advanced phase with respect to the reference image, so that an object for the range finding is at the shorter distance side than the reference point as already mentioned in respect of FIG. 1. Also, in the course of the right shift operation from (b) to (c) of FIG. 2, if there takes place a situation, in which the coincided bit numbers in the contents of the shift registers 54 and 62 become the maximum, this indicates that the reference image has been sampled with a delayed phase with respect to the comparative image, hence the object for the range finding is at a longer distance side than the reference point. Further, the above-mentioned state, wherein the contents of the shift registers 64 and 62 have been shifted to the right for 128 bits, i.e., when the coincided bit numbers in the shift registers 54 and 62 have become the maximum, indicates that the comparative image and the reference image have been sampled with the same phase, so that the object for the range finding is on the reference point. Also, a deviation with respect to the 128-bit shift quantity of the right shift quantity until the coincided bit numbers in the contents of the shift registers 54 and 62 become the maximum corresponds to a distance deviation to the reference point. The reference table 92 has a function of converting the right shift quantity latched by the latching circuit 90 to the distance information. It is a conversion table which obtains the distance information as it is from the content of the latching circuit 90 without performing any particular operations, etc. An output of this reference table 92 is applied to the display device for the distance information as shown in FIG. 1. The display device 30 indicates the distance information in its form of the digital value or in the form of an analog value i.e. on a gauge, etc. by converting it through a D-A converter.

Figure 8:
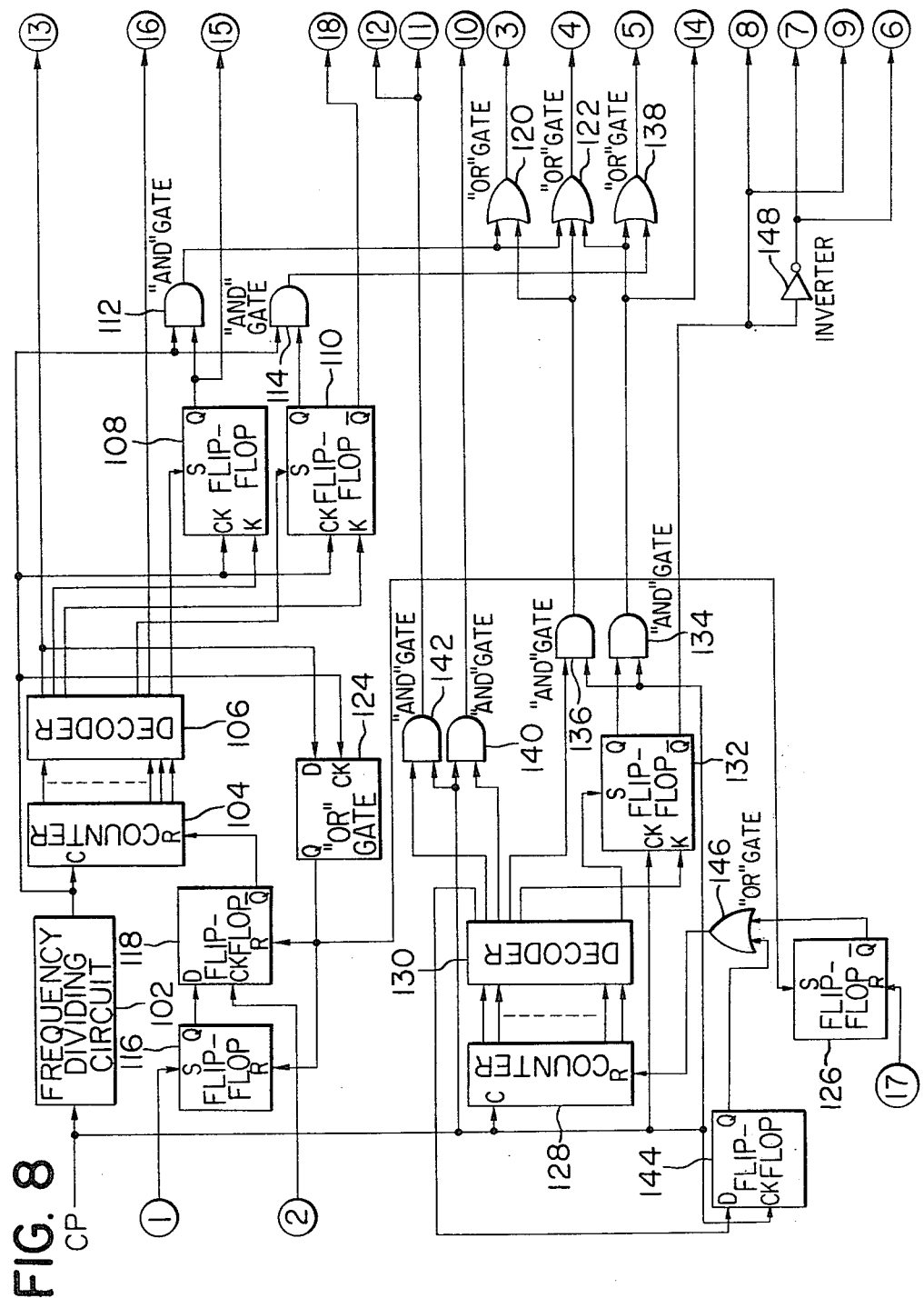
FIG. 8 is a circuit diagram showing a concrete construction of the control circuit in the signal processing circuit shown in FIG. 4.

One example of the detailed circuit construction of the control circuit 82 shown in FIG. 4 is illustrated in FIG. 8, wherein a reference numeral 102 designates a frequency dividing circuit which divides a basic clock pulse CP to form the sampling clock pulses suitable for sampling; a reference numeral 104 indicates a counter to count an output from the frequency dividing circuit 102; a numeral 106 refers to a decoder which produces an output pulse from a corresponding signal line in accordance with the counted quantity of the counter 104; a numeral 108 refers to a J-K flip-flop which produces from a terminal Q an output corresponding to the sampling period $T_1$ of the comparative image on the basis of the output from the decoder 106; a numeral 110 refers to a J-K flip-flop which produces from a terminal Q an output corresponding to the sampling period $T_3$ of the reference image on the basis of the output from the decoder 106; a numeral 112 refers to an "AND" gate which receives the output Q of the J-K flip-flop 108 and the output from the frequency dividing circuit 102 to produce an output timing pulse for sampling of the comparative image; a reference numeral 114 designates an "AND" gate which receives the output Q from the J-K flip-flop 110 and the output from the frequency dividing circuit 102 to produce an output timing pulse for sampling of the reference image; a numeral 116 refers to an S-R flip-flop which receives an input pulse to its setting input terminal S from the terminal①i.e., a pulse of (d) in FIG. 2 from the position detector 28 to be set thereby; and a reference numeral 118 designates a D-type flip-flop which receives the output Q from the S-R flip-flop 116 at an input terminal D and also receives an input pulse to a clock input terminal CK from the terminal②i.e., the pulse of (e) in FIG. 2 from the position detector 28 so as to impart an output $\overline{Q}$ to the reset terminal R of the counter 104. An output from the abovementioned "AND" gate 112 is applied to the shift register 64 in the form of a clock pulse from the terminal ③through an "OR" gate 120, and is also applied to the shift register 62 in the form of a clock pulse for sampling from the terminal④through an "OR" gate 122. On the other hand, an output from the abovementioned "AND" gate 114 is applied to the shift register 54 in the form of a clock pulse from the terminal⑤through an "OR" gate 124.

Incidentally, a signal which indicates that the sampling operations of the reference image and comparative image from the decoder 106 has been completed (i.e., a signal to decode one count after the 385th count of the counter 104) is produced as an output from the terminal ⑬, and, at the same time is imparted to the D-type flip-flop 124, the clock terminal CK of which has received an output pulse from the frequency dividing circuit 102. Further, this signal is also imparted to the reset terminal R of the flip-flop 116 and 118 from the flip-flop 124 as the reset signals for the flip-flops 116 and 118 through the terminal Q. By the resetting of the flip-flops 116 and 118, the resetting input R of the counter 104 becomes "1," hence an output from the counter 104 becomes "0."

Also, the output Q from the D-type flip-flop 124 is applied to the setting terminal S of the flip-flop 126. For the sake of good understanding, the output from the terminal ⑬ is imparted to the reset terminal R of the counter 86 to render the counter 86 to be "0", so that an output from the decoder 88 which has received the output is in "0", hence the flip-flop 126 which has received an input from the terminal ⑰ at its reset terminal R is ready for setting. By this setting operation of the flip-flop 126, the output $\overline{Q}$ therefrom becomes "0," and a counter 128 which receives this output $\overline{Q}$ at its reset terminal R through the "OR" gate 146 commences counting of the basic clock pulse CP.

Further explanations of the circuit construction in FIG. 8 will be given in the following.

A reference numeral 130 designates a decoder which produces an output pulse from a corresponding signal line in accordance with a counted quantity of the counter 128 for counting the basic clock pulse CP; a numeral 132 refers to a J-K flip-flop which produces from its terminal Q an output corresponding to a time required for one recirculation of the shift registers 54 and 62 based on the output from the decoder 130; a numeral 134 refers to an "AND" gate which receives an output Q from the J-K flip-flop 132 and the basic clock pulse CP, and produces an output timing pulse to cause the shift registers 54 and 62 to recirculate; and a numeral 136 refers to an "AND" gate which receives a signal to indicate that the counter 128 is at the 129th count from the decoder 130 and the basic clock pulse CP, and produces a single clock pulse output to cause the shift registers 64 and 62 to shift to the right for 1 bit. An output from the "AND" gate 134 is applied to the shift register 62 as a timing pulse for circulation through the "OR" gate 122, and, at the same time, is applied to the shift register 54 as the timing pulse for circulation through the "OR" gate 138. On the other hand, an output from the "AND" gate 136 is applied to the shift register 64 as a timing pulse for the right shift through the "OR" gate 120, and, at the same time, is applied to the shift register 62 as a timing pulse for the right shift through the "OR" gate 122. For the sake of good understanding, the output pulse from the "AND" gate is produced at the terminal ⑭ and is made the counting pulse for the counter 76 through the "AND" gate 74.

Further, an output from the decoder 130 which indicates the 130th count of the counter 128 is produced at the terminal ⑩ through an "AND" gate 140 so as to be synchronized with the basic clock pulse CP, and this pulse is also used as the reference pulse of the output terminal of the digital comparison circuit 80. Also, an output from the decoder 130 showing the 131st count of the counter 128 is produced at the terminals ⑪ and ⑫ through an "AND" gate 142 so as to be synchronized with the basic clock pulse CP. Of these pulses, the pulse from the terminal ⑪ is applied to the reset terminal R of the counter 76 to reset the counter 76, and the pulse from the terminal ⑫ is applied to the counting terminal C of the counter 86 to cause the counter 86 to advance for 1 count.

An output from the decoder 130 which indicates the 132nd count of the counter 128 is applied to a terminal D of a D-type flip-flop 144 which has received the basic clock pulse at its clock terminal CK, and is applied to the reset terminal R of the counter 128 from the terminal Q of the flip-flop 144 through the "OR" gate 146 to render the content of the counter 128 to be "0."

When the counter 86 counts the output from the terminal ⑫, and reaches a certain definite counted quantity, an output "1" is produced from the decoder 88. This output "1" is introduced as an input through the terminal ⑰. The input from this terminal ⑰ is applied to the reset terminal R of the flip-flop 126, and the output $\overline{Q}$ becomes "1" so as to reset the flip-flop 126. The counter 128 which has been applied with this output $\overline{Q}$ to its reset terminal R through the "OR" gate 146 is thereby reset. Incidentally, the output $\overline{Q}$ of the J-K flip-flop 132 is produced as an output at the terminals ⑧ and ⑨, and is produced as an output at the terminals ⑥ and ⑦ through an inverter 148 to be rendered the control signals for the "AND" gates 56, 60, 66, and 70.

By the above-described construction, the control circuit 82 controls the circuit construction shown in FIG. 4.

Incidentally, in the above-described embodiment, a construction as shown in FIG. 3 has been adopted as the position detector 28, although the construction as shown in FIG. 9 is also feasible.

In FIG. 9, a drive mechanism for the oscillating body 6 is shown. On one part of the oscillating body 6, there is provided an extended part 152 having a long hole or a slot 150. A reference numeral 154 designates a motor, on a shaft 156 of which a worm gear 158 is axially mounted. Also, in a meshing relationship with the abovementioned worm 158, there is provided a worm wheel 162 which is fixed to a rotational shaft 160 rotatably supported on a bearing provided on a main body (not shown) of the device. Further, a disc 166 having an eccentric pin 164 is integrally fixed with the worm wheel 162 in a rotatable manner. The eccentric pin 164, at this time, is engaged with the abovementioned long slot 150, within which it is set in a smoothly slidable manner.

According to this construction, when the motor 154 rotates, the worm wheel 162 rotates in the direction shown by an arrow Z in the drawing, for example, through the worm gear 158, whereby the disc 166 having the eccentric pin 164 performs the same rotation, and, since the eccentric pin 164 is engaged with the long slot 150, the oscillating body 6 oscillates in the direction of X-Y with the shaft 12 as the center of oscillation with an amplitude corresponding to the numbers of revolution of the motor 154. In this construction, a reference numeral 168 designates an encoder having a multitude of thin slits 170 in correspondence to each of the oscillating phase positions at the time of oscillation of the oscillating body 6. The encoder rotates with the worm wheel 162. Above and below the encoder 168, there are disposed a light emitting diode 172 and a photodiode 176 having a slit plate 174 thereon in such a positional relationship that both component parts hold therebetween a passage for the slit 170. According to this construction, light beam from the light emitting diode 172 enters into the photodiode 176 at the time of rotation of the encoder 168, when the slit in the slit plate 174 and the slit 170 of the encoder 168 become coincided, as the result of which a pulse signal in accordance with the oscillating phase position of the oscillating body 6 is generated from the photodiode 176.

By adoption of such construction for the oscillating mechanism and the position detecting mechanism for the oscillating body 6, it becomes possible to use directly the output pulse signal of the abovementioned photo-diode 176 as the sampling pulse, whereby the sampling operation becomes feasible in accordance with the oscillating phase position of the oscillator 6. On account of this, there would result such advantages that not only the frequency dividing circuit 102 for generating the sampling pulse becomes unnecessary, but also the sampling operation can be carried out accurately against variations and fluctuations in the oscillating cycles of the oscillator 6 in direct pursuance of the oscillating phase position of the oscillator 6.

Further, by additionally providing another light emitting diode and photodiode in pair, and a separate encoder slit exclusive for this pair to detect a particular point in one rotation of the encoder 168, it becomes possible, unlike the mechanism as shown in FIG. 3, to detect the oscillating phase position of the oscillator 6 with clear distinction of whether it is the oscillation in the X direction or in the Y direction, without the output detecting pulse being produced in both at every oscillation of the oscillator 6 at a certain oscillating phase position in the X and Y directions. On account of this, there are such advantages that the starting point for the sampling operation can be accurately detected, and the flip-flops 116 and 118 in FIG. 8 can be replaced by a single flip-flop with this detection pulse as its setting input, and various other advantages.

Incidentally, in the embodiment shown in FIG. 1, the center optical axis of the second optical system for obtaining the scanning signal of the comparative image is so fixedly disposed that it may intersect with the center optical axis of the first optical system for obtaining the reference image at a reference point in a certain definite distance. It is, however, possible that a construction, in which this reference point is made variable, can also be adopted.

Figure 10:
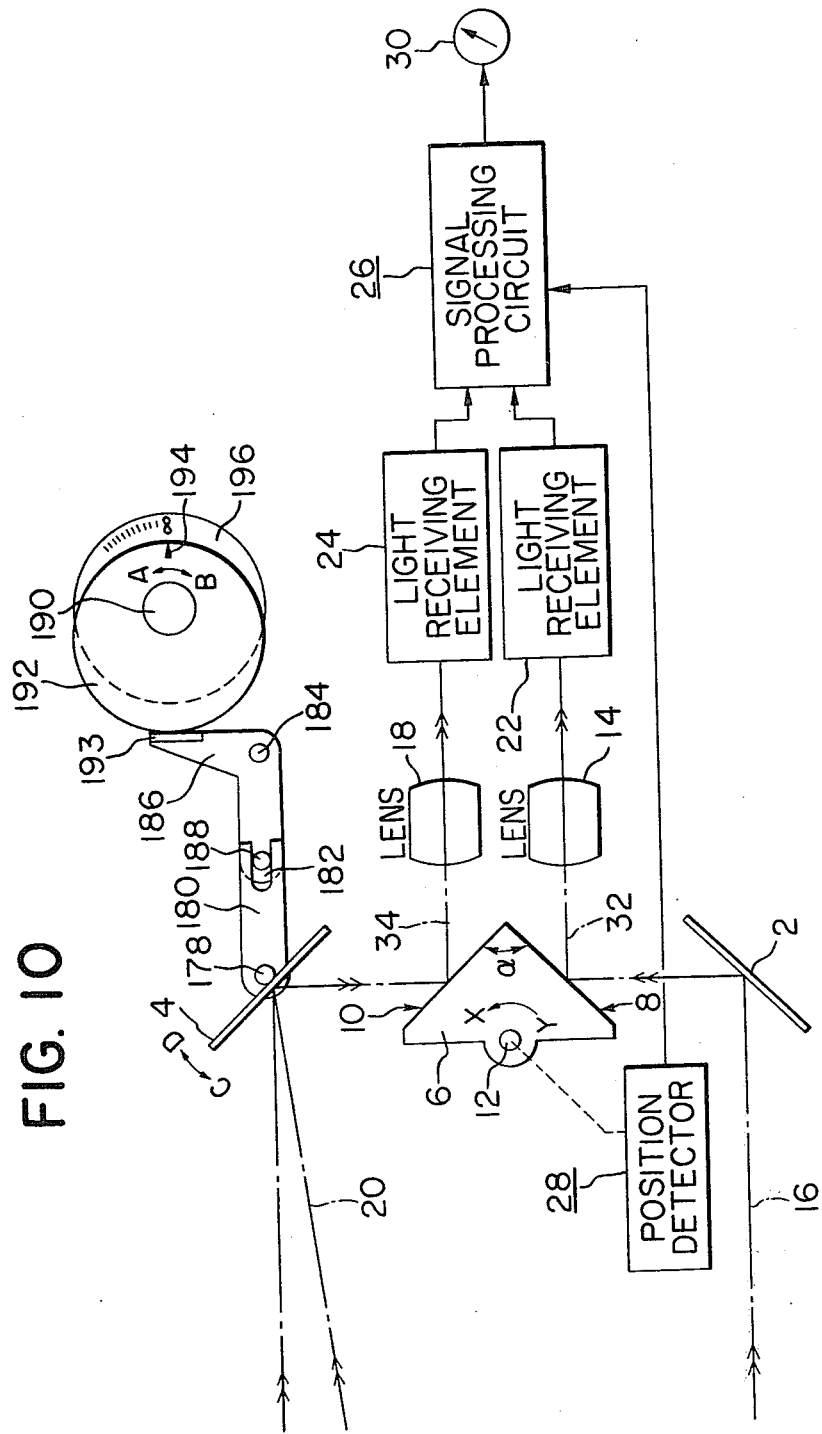
FIG. 10 is a schematic construction diagram of another embodiment of the range finding device according to the present invention.

FIG. 10 shows another schematic construction of further embodiment of the present invention based on such viewpoint. The points of different in this construction from that shown in FIG. 1 reside in that the second mirror 4 is oscillatable with the shaft 178 as its center of oscillation, and a pointing angle of the center optical axis 20 of the second optical system for obtaining the scanning signal of the comparative image is made variable. Incidentally, the abovementioned shaft 178 is fixed on the arm 180 having a long slot portion 182, and is supported by a bearing member (not shown) in a rotatable manner, while the long slot portion 182 is engaged with a pin 188 provided on a rotatable lever 186 with the shaft 184 as its center. On the other hand, the lever 186 contacts with a rotatable eccentric cam 192 at its contacting part 193 with the shaft 190 as its center. By causing the abovementioned eccentric cam 192 to rotate in the A-B directions, it becomes possible to rotate the lever 186 with the shaft 184 as its center of rotation with the result that the second mirror 4 can be oscillated in the directions indicated by an arrow C-D by the arm 180.

In this construction, too, the signal processing circuit 26 adopts substantially same construction as shown in FIG. 4, with the exception that the reference table 92 which has received an output from the latching circuit 90 is replaced by a digital comparison circuit to discriminate whether the content of the latching circuit 90 is larger or smaller than "128," or is coincided therewith. The display device 30 is also replaced by one which is capable of indicating the abovementioned three conditions.

According to such construction, as the compared results between the reference image and the comparative image can be obtained in the state such as shown in (b) of FIG. 7, the reference point and the object for the range finding which the center optical axis 20 of the second optical system points are coincided, and the distance to this reference point can be readily found out mechanically by causing it to correspond to the inclination of the second mirror 4, so that the rotational position of the eccentric cam 192 at this time can be made correspondent to the distance information, as it is.

In more detail, the displaying device 30, in this case, carries thereon an indication as to whether the comparative image is in an advanced phase or in a delayed phase with respect to the reference image. In accordance with this indication, therefore, if the comparative image is in a delayed phase with respect to the reference image, it indicates that the reference point is at the short distance side to the object for the range finding, hence the eccentric cam 192 is rotated to bring the reference point to a long distance side; on the other hand, if the comparative image is in an advanced phase, it indicates that the reference point is at a long distance side with respect to the object for the range finding, hence the eccentric cam 192 is rotated to shift the reference point to a short distance side. Through the abovementioned operations, when the reference point becomes coincided with the object for the range finding, the scanning signal of the reference image and that of the comparative image are brought into the same phase with the consequent indication to this effect on the display device 30, and the eccentric cam 192 may be stopped its rotation in compliance with this indication.

The rotational position of the eccentric cam at this time can be made correspondent, as it is, to the distance upto the reference point, so that a direct reading of the distance up to the object for the range finding can be done by matching a display symbol 194 printed on this eccentric cam 192 and distance dial on a distance indicating disc 196 which is fixedly provided.

Also, by interlocking the rotational shaft of this eccentric cam 192 with a distance ring of a photographic lens in a camera, etc., a semi-automatic focussing mechanism in a photographic camera can be constructed. For instance, the abovementioned display device 30 is incorporated in a range finder of a camera, and the distance ring of the photographic lens is manipulated in accordance with indication in the display device, whereby the focussing operation can be done very simply.

In the embodiments shown in FIGS. 1 and 10, the image surface luminance distribution signals of the reference image and the comparative image are compared by converting them into two-value, though it may also be possible to adopt such a construction that the distribution signals of variations in the image surface luminance in each image are converted into two-value for the comparison.

Figure 11:
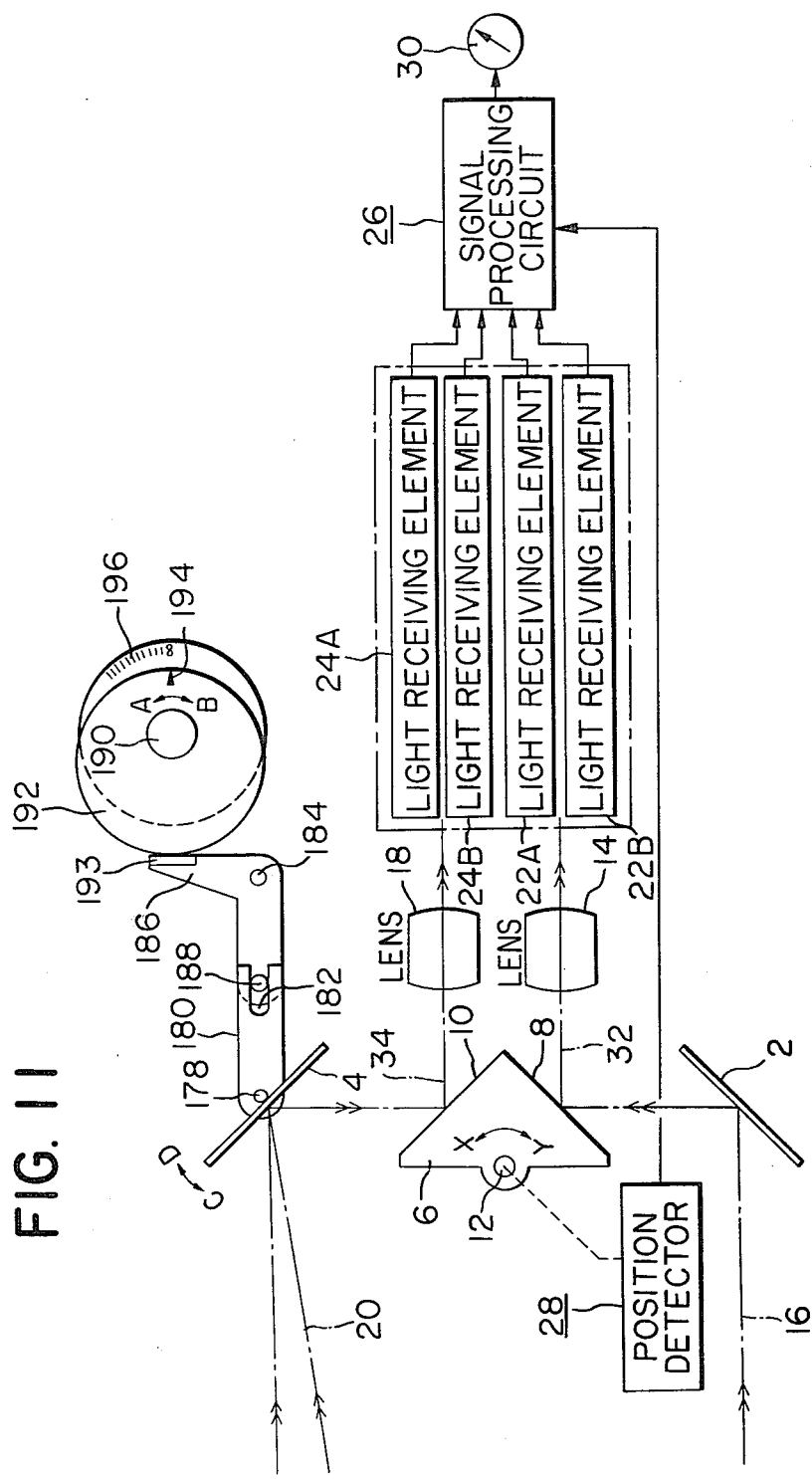
FIG. 11 is a schematic construction diagram of still another embodiment of the range finding device according to the present invention.

An embodimental construction shown in FIG. 11 is for realizing such idea as described in the preceding, wherein two light receiving elements 22A and 22B which are split into two pieces in the scanning direction of the reference image are arranged in place of the first light receiving element 22, and the other two light receiving elements 24A and 24B which are split into two pieces in the scanning direction of the comparative image are arranged in place of the second light receiving element 24, a signal based on a deviation between the outputs from the light receiving elements 22A and 22B is used as the scanning signal for the reference image, and a signal based on a deviation between the outputs from the light receiving elements 24A and 24B is used as the scanning signal for the comparative image. These light receiving elements 22A, 22B, 24A, and 24B all have a very limited width of the light receiving surface, and the light receiving elements 22A and 22B, and the light receiving elements 24A and 24B are disposed at a very close space interval between each other.

For the signal processing circuit suitable for such construction, there may be adopted a construction substantially similar to that shown in FIG. 4, although, with respect to the outputs from the two light receiving elements to be obtained at one sampling operation, there are required two informations as to whether the deviation is a positive or a negative, and whether the deviation is greater or smaller than a certain definite magnitude, so that both are required to be taken as two-bit informations in parallel.

Figure 12:
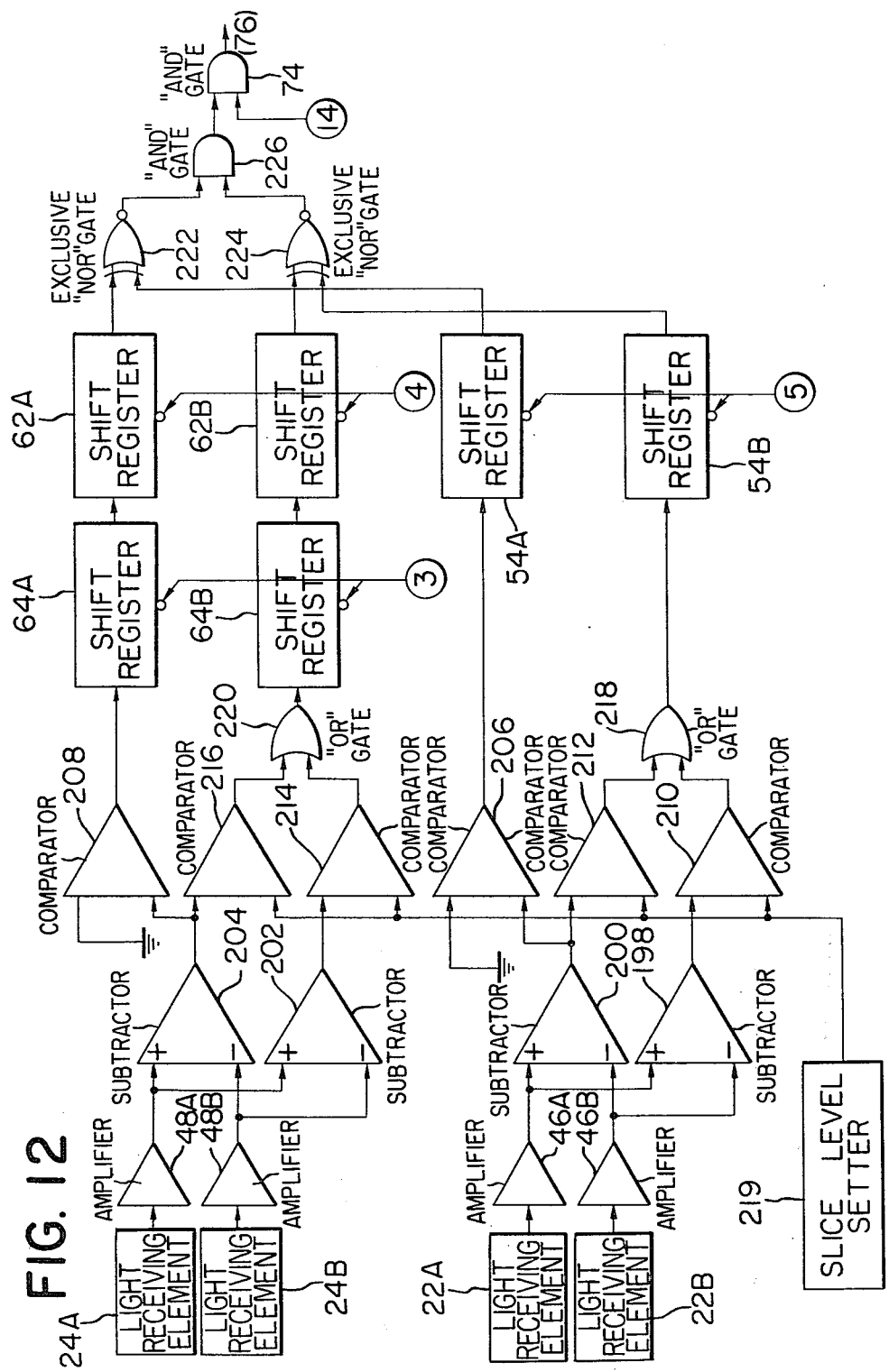
FIG. 12 is a partial circuit construction diagram showing the only circuit portion which differs from the construction of the signal processing circuit in the device of FIG. 1, or more particularly, the circuit shown in FIG. 4.

In order to carry out such signal processing, a circuit construction as shown in FIG. 12, as one example, may be employed. In the illustration, reference numerals 46A, 46B, 48A, and 48B respectively designate amplifiers for amplifying output signals from the light receiving elements 22A, 22B, 24A, and 24B. A reference numeral 198 is a subtractor for subtracting an output of the amplifier 46A from an output of the amplifier 46B; a numeral 200 refers to a subtractor for subtracting an output of the amplifier 46B from an output of the amplifier 46A; a numeral 202 refers to a subtractor to subtract an output of the amplifier 48A from an output of the amplifier 48B; a numeral 204 is a subtractor for subtracting an output of the amplifier from an output of the amplifier 48A; a reference numeral 204 denotes a comparator which produces, on the basis of an output from the subtractor 200, an output "1", if the result is either a positive or zero, and an output "0", if it is a negative; a reference numeral 208 denotes a comparator which produces, on the basis of an output from the subtractor 204, an output "1," if the result is either a positive or zero, and an output "0," if it is a negative; reference numerals 210, 212, 214, 216 respectively designate comparators which have received at one of the input terminals thereof outputs from the subtractors 198, 200, 202, and 204, respectively, and, at the other input terminals thereof an output from a slice level setter 219, the outputs from the comparators 210 and 212 being input in the "OR" gate 218, and the outputs from the comparators 214 and 216 being input in an "OR" gate 220. In other words, the output "1" is produced from the comparator 206 when the output of the light receiving element 22A is either greater than, or equal to, the output from the light receiving element 22B, is produced from the "OR" gate 218 when a difference between the two outputs is greater than a predetermined value, is produced from the comparator 208 when the output from the light receiving element 24A is greater than, or equal to, the output from the light receiving element 24B, and is produced from the "OR" gate 218 when a difference between the two outputs is greater than a predetermined value. Incidentally, these four amplifiers 46A, 46B, 48A, and 48B are preferably the logarithmic compression amplifiers. That is, if they are so, there can be obtained a ratio of luminance between mutually adjacent two points in the image surface luminance distribution from the four subtractors 198, 200, 202, and 204 in the subsequent stage with the consequent removal of noises due to periodical variations in brightness in the object for the range finding, whereby only the signal which exactly corresponds to the distribution in the image surface luminance variations can be obtained.

These signals are received by and stored in the shift registers 54A and 54B provided in two systems in correspondence to the reference image, and the shift registers 64A, 62A, 64B, and 62B provided in two systems in correspondence to the comparative image. Incidentally, although no gate means to be disposed around these shift registers are illustrated in FIG. 12, they can be easily constructed when various gate means shown in FIG. 4 are applied to each of the abovementioned shift registers.

A signal concerning the deviation in positive or negative (i.e., the output from the shift register 54A) and a signal concerning the deviation in positive or negative (i.e., the output from the shift register 62A) are compared by an exclusive "NOR" gate 222. If both signals are coincided, an output "1" is produced, and if they are not coincided, an output "0" is produced.

Also, a signal concerning largeness or smallness (magnitude) in the deviation corresponding to the reference image (i.e., the output from the shift register 54B) and signal concerning largeness and smallness in the deviation corresponding to the comparative image (i.e., the output from the shift register 52B) are compared by an exclusive "NOR" gate 224. If both signals are coincided, an output "1" is produced, and if they are not, and output "0" is produced. The outputs from these exclusive "NOR" gates 222 and 224 are introduced into an "AND" gate 226 as an input, and an output "1" can be obtained from the "AND" gate 226 when both outputs are "1". It should be noted that the otuput from this "AND" gate 226 can be treated in exactly an equal value with the output from the exclusive "NOR" gate 72 shown in FIG. 4. The same holds true with the processing thereafter, as is the case with the construction in FIG. 4. It goes without saying that the handling of the shift register 54A is exactly same as the shift register 54A shown in FIG. 4, the handling of the shift registers 62A and 62B is exactly same as the shift register 64 shown in FIG. 4, and the handling of the shift registers 64A and 64B is exactly same as the shift register 64 shown in FIG. 4.

FIG. 13 shows one example, in which the range finding device shown in FIGS. 11 and 12 in particular is applied to an automatic focus adjusting system for a photographic camera, the basic construction of which comprises the optical construction shown in FIG. 11, the circuit construction shown in FIGS. 4, 8, and 12, and the drive mechanism of the oscillating body shown in FIG. 9.

A reference numeral 228 in this figure of the drawing designates a disc for detecting a position of the oscillating body 6 and for generating clock pulse, which is made of a thin ferromagnetic material. As will be understandable from the drawing, a multitude of tooth-shaped projections 232 which pass through the magnetic poles of a clock pulse generating portion 230 and a tooth-shaped projection 236 for detecting a sampling start position, which passes through the magnetic poles of an oscillating phase position detecting part 234, are formed on this disc, in the similar construction as the detecting part 36 shown in FIG. 3. Outputs from detecting coils 238 and 240 provided on the clock pulse generating part 230 and the position detecting part 234, respectively, are the induction current due to the magnetic field which varies at the instant when the abovementioned tooth-shaped projections 232 and 236 pass through the magnetic poles, and these outputs are introduced into the signal processing circuit 26. The tooth-shaped projection 236 is provided at a position corresponding to such oscillating position of the oscillating body 6 where the pulse b shown in (e) of FIG. 2 can be obtained. A reference numeral 242 designates a photo-taking optical system, on the focal plate of which a photographic film 244 is disposed. The photo-taking operation of an object is made possible by a known exposure control mechanism which is not shown in the drawing. The photo-taking optical system 242 is supported by a lens barrel 246, on one portion of which a large gear 248 is formed in a meshing relationship with a small gear 252 mounted on the rotational shaft of a servo-motor 250. Revolution of the servo-motor 250 causes the lens barrel 246 to rotate, whereby the focus adjustment of the photo-taking optical system 242 becomes possible. In one portion of the lens barrel 246, where is further formed a slot cam 254, with which a cam follower 260 is engaged. This cam follower is implanted at one end of an arm 258 which fixedly supports thereon the second mirror 4 and is rotatable on a rotational shaft 256 as its center. According to this construction, when the focus adjustment of the photo-taking optical system 242 is conducted upon rotation of the lens barrel 246, the second mirror 4 rotates in correspondence to the adjusted position of the photo-taking optical system 242. Here, if a profile of the slot cam 254 is so predetermined that the clearest image of the object to be photographed may be formed on the film 244, when the second mirror 4 is so set that a relative spatial parallax of the reference image and the comparative image may become zero, it becomes possible to process the outputs from the light receiving elements 24A, 24B, 22A and 22B through the circuit construction shown in FIGS. 4 and 12 and to control the servo-motor 250 by the servo-motor control circuit 251 so that a phase difference between the deviation signal of the reference signal and the deviation signal of the comparative image may become zero, whereby the photo-taking optical system 242 is stopped at an accurate focus adjusting position. Here again, if the relative spatial parallax of the two images is generated, the servo-motor 250 is driven in the direction corresponding to the direction of the discrepancy, whereby the focus adjustment of the photo-taking optical system is automatically done. In this consequence, the second mirror 4 is re-adjusted to realize a state, wherein the relative spatial parallax of the two images are finally extinguished, whereupon the servo-motor 250 stops its operation. At this time, the object for the photo-taking operation on the film surface is in the clearest condition, as mentioned in the foregoing, whereby the automatic focus adjustment is achieved. A reference numeral 262 designates a finder optical system provided behind the first mirror 2 which is formed here as a semi-transparent mirror. The light beam 16 of the reference image is partially reflected by the first mirror 2 and projected onto the first oscillating mirror 8, and, at the same time, projected onto the finder optical system 262 to form the reference image on a finder focussing plate 264. Accordingly, a photographer can perform the focus adjustment with respect to an intended object for photo-taking in an accurate manner, while constantly observing the reference image of the object for photo-taking through the abovementioned finder system.

Figure 14:
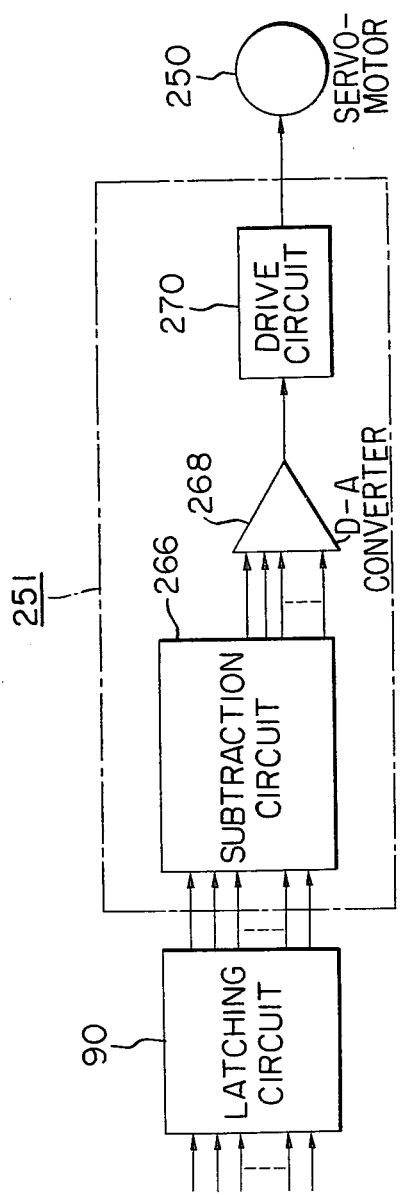
FIG. 14 is a circuit construction diagram showing one concrete example of the servo-motor control circuit in the automatic focus adjusting system shown in FIG. 13.

The servo-motor control circuit 251 shown in FIG. 13 is further detailed in FIG. 14, in which a reference numeral 266 designates a subtraction circuit which receives a digital signal from a circuit corresponding to the latching circuit 90 shown in FIG. 4 and subtracts "128" from this digital signal. In other words, this subtraction circuit is to operate, through this subtraction, to the extent the comparative image is in an advanced phase or in a delayed phase with respect to the reference image. The operated results of this subtraction circuit 266 is applicable as a signal for the servo control, as it is. That is, the amount of discrepancy between the reference image and the comparative image can be made correspondent to the servo quantity as it is, and the direction of the discrepancy can be made correspondent to the direction where the servo is applied. Accordingly, by converting the output from the subtraction circuit 266 into an analog-servo signal through a D-A converter 268 capable of producing output in both positive and negative polarities and imparting this analog-servo signal to a drive circuit 270 of the servo-motor 250, the servo-motor 250 can be stopped at such a position where the phase discrepancy between the reference image and the comparative image may become zero.

In the above-described embodiment, the embodiment of the range finding device shown in FIG. 11 has been basically used as the automatic focus adjustment system in the optical apparatuses and appliances in cameras, etc., although it is, of course, possible to apply the embodiment of the range finding device shown in FIG. 10 to the same degree as that of the FIG. 11 embodiment.

As stated in the foregoing, according to the present invention, there can be provided a more improved range finding device which has solved the various inconveniences as stated at the outset, sufficiently guarantees precision in the range finding operations, constantly provides reliable and accurate distance information, is free from any difficulty in its reduction into practice, and, in particular, when applied to a semi-automatic or full automatic focus adjusting device in optical apparatuses and appliances such as photographic cameras, etc., can attain constantly reliable and accurate focus detection and focus adjusting operations. In operations, a digital signal processing method, which is totally different from the processing method utilized in the conventional device is adopted, by which the precision in the range finding operation is further improved, and accuracy in the operation becomes further expectable. Also, mixing of noise signal at the time of scanning of the two signals is prevented in advance to provide a highly accurate image scanning signal. Since the data concerning these two images are processed after the sampling operations in associatoin with the scanning cycles, i.e., the oscillating cycles of the vibrating optical means, the range finding device according to the present invention may be applied to the servo system, hence it can be effectively applied to the automatic focus adjusting system in the optical apparatuses and appliances such as photographic cameras, etc.

In the embodiments which have so far been explained, the results of the sampling operations are processed by converting them into two-value signal of "1" or "0" on the march of a certain definite slice level. It is, however, possible that they may be processed by converting them into digital value of two or more bits. In this case, the concept of the shift registers, the exclusive "NOR" gates, and the "AND" gates, and so on as shown in FIG. 12 can be expanded for application to this construction. This can be realized through a simple modification of the circuit shown in FIG. 4.

Further, there may, of course, exist a concept derived from combination of the construction shown in FIGS. 10 and 11, by which a more accurate range finding becomes possible through conduction of a mutually supplementary distance detection. In this case, the light receiving elements 22A and 24A in FIG. 11 are treated as being equivalent to the light receiving elements 22 and 24 in FIG. 10, whereby the range finding device can be realized through a simple modification and combination of the circuits shown in FIGS. 4 and 12.

The abovementioned light receiving elements 22, 24; 22A, 22B and 24A, 24B may be integrally constructed as indicated by dot-and-dash line in FIGS. 1 and 11. In so doing, positioning and adjusting of these light receiving elements with respect to the range finding optical system (2, 4, 8, 10, 14, and 18) become easy. In particular, since the focussing magnification of the image on each of the light receiving surfaces of both light receiving elements 22, 24; 22A, 22B; and 24A, 24B can be easily made equal, the precision in the range finding will be further improved.

What is claimed is:

1. A range finding device comprising:
   (a) a range finding optical system arranged to form first and second images of an object with a relative positional parallax corresponding to the range from the device to the object;
(b) first and second photoelectric light receiving means arranged to receive said first and second images respectively;
(c) vibrating optical means for displacing said respective first and second images on the light receiving surfaces of said respective first and second light receiving means at the same cycle, said first and second light receiving means scanning said respective first and second images at the time of displacement of said first and second images by said vibrating optical means to provide image data concerning said first and second images;
(d) first and second data storing means for receiving and storing image data concerning said first and second images provided by said first and second light receiving means;
(e) coincidence detecting means for detecting coincidence between the data concerning image elements corresponding to said first and second images stored in said first and second storing means;
(f) means for causing the image data concerning the second image stored in said second storing means to relatively shift, at a predetermined quantity, with respect to the image data concerning the first image stored in said first storing means; and
(g) counting means for counting the relative shift quantity of the image data concerning the second image stored in said second storing means with respect to the image data converting the first image stored in said first storing means, whereby the range of the object is found from quantities counted by said counting means when said coincidence detecting means detects the optimum coincidence between the data in a predetermined quantity concerning the corresponding image elements of said first and second images between the image data stored in said first and second storing means.

2. A range finding device according to claim 1, further comprising: alignment storing means for storing the relative alignment between the elements of the first image and the elements of the second image which yields the optimum coincidence between the stored image data stored in said first and second data storing means, said alignment storing means being coupled with said coincidence detecting means and said counting means, and storing the quantities counted by said counting means as the abovementioned alignment which yields the optimum coincidence, when said coincidence detecting means detects the optimum coincidence of the data in the predetermined quantities concerning the corresponding image elements of the first and second images between the image data stored in said first and second data storing means.

3. A range finding device according to claim 2, further comprising: converting means for converting each of the image data concerning said first and second images from said first and second light receiving means into digital data, said converting means being coupled with the first and second light receiving means; and said first and second data storing means being coupled with said converting means to receive and store therein the digital image data provided by said converting means.

4. A range finding device according to claim 3, in which said first data storing means has N storing locations to store the digital image data concerning N successive elements of the first image, and said second data storing means has M storing locations to store the digital image data concerning M successive elements of the second image (where M < N), and said coincidence detecting means is arranged with respect to said first and second data storing means so that it may detect coincidence of the digital image data of said M successive elements of the second image stored in said second data storing means with respect to the digital image data concerning said N successive elements of the first image stored in said first data storing means.

5. A range finding device according to claim 4, wherein said coincidence detecting means comprises:
a first detecting circuit for detecting the degree of coincidence of the digital image data concerning said M successive elements of the second image stored in said second data storing means with respect to the digital image data concerning the N successive elements of the first image stored in said first data storing means, said first detecting circuit being coupled with both said first and second data storing means, and a second detecting circuit for detecting the optimum coincidence between the N successive elements of the first image and different sets of N successive elements of the second image, said second detecting circuit being coupled with said first detecting circuit, said alignment storing means being coupled with said second detecting means, and storing, as the alignment which yields the optimum coincidence, the quantities counted by said counting means when said second detecting circuit detects the optimum coincidence between the N successive elements of the first image and different sets of N successive elements of the second image.

6. A range finding device according to claim 5, wherein said first storing means is a first shift register having said N storing location, and said second storing means comprises a second shift register having N storing locations, and a third shift register having M-N storing locations, said first detecting circuit being coupled with said first and second shift registers, and detecting the degree of similarity between the N numbers of digital image data stored in the first and second shift registers, and said shifting means being coupled with said second and third shift registers, and shifting the digital image data stored in said third shift register, one by one, to said second shift register, at every termination of the detection sequence by said second and third shift registers.

7. A range finding device according to claim 6, wherein said first detecting circuit comprises: a match detector to detect a match among the N numbers of digital image data stored in said first and second shift registers, respectively, on an element-by-element basis, said match detector being coupled with said first and second shift registers; and a match counter to count the number of matches among each N numbers of the digital image data stored in said first and second shift registers and detected by said match detector, said second detecting circuit being coupled with said match counter, and detecting the optimum coincidence between the N successive elements of the first image and the different sets of N successive elements of the second image from the counted value of said match counter.

8. A range finding device according to claim 7, wherein said second detecting circuit comprises: a match count comparator for detecting the largest match count of said match counter, said comparator being coupled with the match counter, and said alignment storing means being coupled with said match count comparator, and storing therein as said alignment which yields the optimum coincidence, the counted quantities of said counting means when said match count comparator detects the largest match count of the match counter.

9. A range finding device according to claim 8, wherein said first and second shift registers are of recirculating type; said third shift register is of nonrecirculating type; said match detector detects the match among the digital image data at the time of recirculation of each N numbers of stored digital image data at said first and second shift registers on an element-by-element basis; and said shifting means shifts the digital image data stored in said third shift register, bit by bit, to said second shift register, at every termination of one recirculation of the N numbers of stored digital image data at said first and second shift registers.

10. A range finding device according to claim 9, wherein said match detector comprises: an exclusive "NOR" gate to provide an output only when two input digital data are coincided, said gate being coupled with said first and second shift registers, and said match counter being coupled with said exclusive "NOR" gate, and counting the numbers of said output which said gate provides at the time of one recirculation of the N number of stored digital image data at said first and second shift registers.

11. A method for detecting range of an object, comprising the steps of:
 (a) forming first and second images of said object with a relative positional parallax corresponding to the range thereof;
 (b) electrically sensing said first and second images to produce a first electrical signal of the first image and a second electrical signal of the second image, said sensing process comprising:
  (1) periodical shifting of said first and second images at the same cycle;
  (2) producing of electrical signals of said images at the time of the periodical shifting of said first and second images;
  (3) picking-up of said first electrical signal of the first image out of said electrical signals within the range of the first phase, at the time of the periodical shifting of said first and second images;
  (4) picking-up of said second electrical signal of the second image out of said electrical signals within the range of the second phase including said first phase range and being broader than said first phase range, at the time of the periodical shifting of said first and second images;
 (c) storing said first and second electrical signals of the images;
 (d) electrically correlating said first and second signals of the images to detect the relative locations of corresponding portions of said first and second images, said correlating process comprising:
  (1) comparing N successive elements of said stored signal of the first image with a plurality of different sets of N successive elements of said stored signal of the second image to detect the degree of similarity between the stored data for said N successive elements of said first image and said stored data for each of said plurality of different sets of N successive elements of said second image; and
  (2) detecting, from the results of the comparison process, which set of N successive elements of said second image is most similar to said N successive elements of said first image; and
 (e) detecting the range of said object from the location with the second image of said set of N successive elements of the second image which is most similar to said N successive elements of the first image.

12. A method according to claim 11, further comprising the step of quantizing said first and second signals of said images before said storing process.

* * * * *

UNITED STATES PATENT AND TRADEMARK OFFICE
CERTIFICATE OF CORRECTION

PATENT NO. : 4,135,815
DATED : January 23, 1979
INVENTOR(S) : MAKOTO MASUNAGA, ET AL It is certified that error appears in the above-identified patent and that said Letters Patent are hereby corrected as shown below:

Col. 13, line 12, "112/128 x 256 msec." should read

-- $\dfrac{112}{128 \times 256}$ msec. --

Signed and Sealed this

First Day of May 1979

[SEAL]

Attest:

RUTH C. MASON
Attesting Officer

DONALD W. BANNER
Commissioner of Patents and Trademarks